(12) United States Patent
Kenthapadi et al.

(10) Patent No.: US 10,460,128 B2
(45) Date of Patent: *Oct. 29, 2019

(54) COLLECTION FLOW FOR CONFIDENTIAL DATA

(71) Applicant: Microsoft Technology Licensing, LLC, Redmond, WA (US)

(72) Inventors: Krishnaram Kenthapadi, Sunnyvale, CA (US); Stephanie Chou, San Francisco, CA (US); Ahsan Chudhary, Sunnyvale, CA (US); Ryan Wade Sandler, San Francisco, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/176,993

(22) Filed: Oct. 31, 2018

(65) Prior Publication Data

US 2019/0065779 A1 Feb. 28, 2019

Related U.S. Application Data

(63) Continuation of application No. 15/222,774, filed on Jul. 28, 2016, now Pat. No. 10,157,291.

(51) Int. Cl.
| | |
|---|---|
| *G06F 21/62* | (2013.01) |
| *G06N 20/00* | (2019.01) |
| *G06F 16/901* | (2019.01) |
| *H04L 29/06* | (2006.01) |
| *H04L 29/08* | (2006.01) |

(52) U.S. Cl.
CPC ...... *G06F 21/6245* (2013.01); *G06F 16/9017* (2019.01); *G06F 21/6209* (2013.01); *G06N 20/00* (2019.01); *H04L 63/06* (2013.01); *H04L 63/102* (2013.01); *H04L 67/306* (2013.01); *G06F 2221/2151* (2013.01)

(58) Field of Classification Search
CPC .................................................. G06F 21/6245
USPC ......................................................... 726/28
See application file for complete search history.

(56) References Cited

U.S. PATENT DOCUMENTS 10,157,291 B1 * 12/2018 Kenthapadi ......... G06F 21/6245

* cited by examiner

*Primary Examiner* — Jacob Lipman
(74) *Attorney, Agent, or Firm* — Schwegman Lundberg & Woessner, P.A.

(57) ABSTRACT

In an example embodiment, an attribute interference model is trained by a machine learning algorithm to output missing attribute values from a member profile of a social networking service. In an attribute inference phase, an identification of a member of a social networking service is obtained. A member profile corresponding to the member of the social networking service is retrieved using the identification. The member profile is then passed to the attribute inference model to generate one or more missing attribute values for the member profile. A collection flow, defined in a user interface of a computing device, is modified based on the generated one or more missing attribute values, the collection flow defining a sequence of screens for collecting confidential data. The modified collection flow is then presented to the member in the user interface to collect confidential data from the member.

20 Claims, 19 Drawing Sheets

| TRANSACTION ID 604 | CONFIDENTIAL DATA 606 |
|---|---|
| ZZZ | XXX |
| ZZZ | XXX |
| ZZZ | XXX |
| ZZZ | XXX |
| ZZZ | XXX |

600

| TRANSACTION ID 608 | MEMBER ID 610 | TIMESTAMP 612 | FIRST ATTRIBUTE 614 | SECOND ATTRIBUTE 616 |
|---|---|---|---|---|
| ZZZ | YYY | 5/31/16 04:15:15 | SAN FRANCISCO | SOFTWARE ENGINEER |
| ZZZ | YYY | 5/31/16 10:15:12 | LOS ANGELES | SOFTWARE ENGINEER |
| ZZZ | YYY | 6/1/16 01:12:12 | LOS ANGELES | PRODUCT MANAGER |
| ZZZ | YYY | 6/2/16 23:15:59 | DALLAS | VICE PRESIDENT, SALES |
| ZZZ | YYY | 6/3/16 05:43:12 | NEW YORK | HR BUSINESS PARTNER |

COLLECTION FLOW FOR CONFIDENTIAL DATA

CROSS-REFERENCE TO RELATED APPLICATIONS

This application is a continuation of prior application Ser. No. 15/222,774, filed on Jul. 28, 2016, which is incorporated by reference herein in its entirety.

TECHNICAL FIELD

The present disclosure generally relates to computer technology for solving technical challenges in collection and maintenance of confidential data in a computer system. More specifically, the present disclosure relates to collecting confidential data.

BACKGROUND

In various types of computer systems, there may be a need to collect, maintain, and utilize confidential data. In some instances, users may be reluctant to share this confidential information over privacy concerns. These concerns extend not only to pure security concerns, such as concerns over whether third parties such as hackers may gain access to the confidential data, but also to how the computer system itself may utilize the confidential data. With certain types of data, users providing the data may be somewhat comfortable with uses of the data that maintain anonymity, such as the confidential data merely being used to provide broad statistical-based analysis to other users.

One example of such confidential data is salary/compensation information. It may be desirable for a service such as a social networking service to entice its members to provide information about their salary or other work-related compensation in order to provide members with insights as to various metrics regarding salary/compensation, such as an average salary for a particular job type in a particular city. There are technical challenges encountered, however, in ensuring that such confidential information remains confidential and only used for specific purposes, and it can be difficult to convince members to provide such confidential information due to their concerns that these technical challenges may not be met. Additionally, it can be difficult to ensure accuracy and reliability of the confidential data.

BRIEF DESCRIPTION OF THE DRAWINGS

Some embodiments of the technology are illustrated, by way of example and not limitation, in the figures of the accompanying drawings.

FIG. 6 is a diagram illustrating an example of a first submission table 600 and second submission table, in accordance with an example embodiment.

DETAILED DESCRIPTION

Overview

The present disclosure describes, among other things, methods, systems, and computer program products. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, an architecture is provided that gathers confidential information from users, tracks the submissions of the confidential information, and maintains and utilizes the confidential information in a secure manner while ensuring that the confidential information is accurate and reliable.

Figure 1:
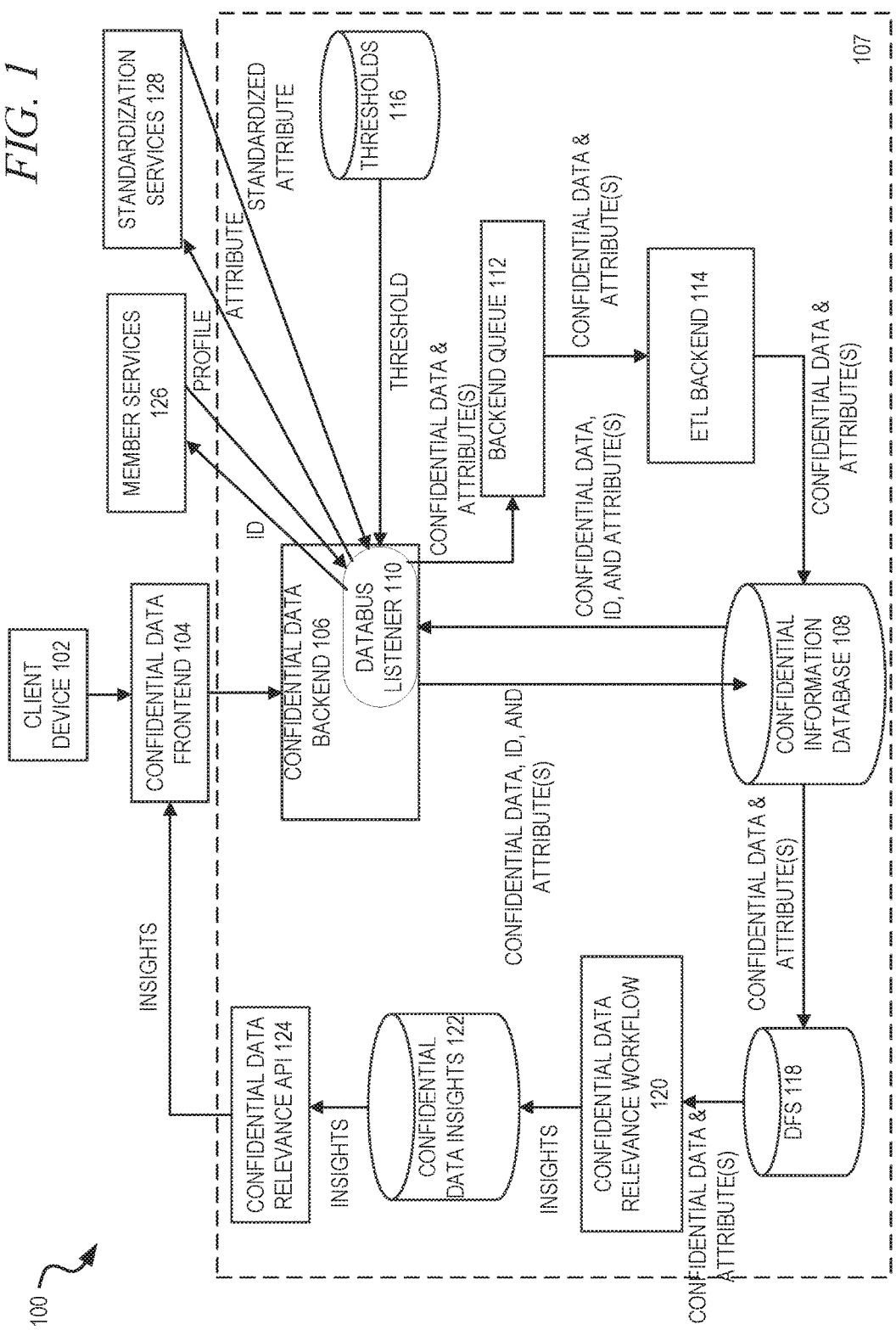
FIG. 1 is a block diagram illustrating a confidential data collection, tracking, and usage system, in accordance with an example embodiment.

FIG. 1 is a block diagram illustrating a confidential data collection, tracking, and usage system 100, in accordance with an example embodiment. A client device 102 may utilize a confidential data frontend 104 to submit confidential information to the confidential data backend 106. In some example embodiments, the confidential data backend 106 is located on a server-side or cloud platform 107 while the confidential data frontend 104 is directly connected or embedded in the client device 102. However, in some example embodiments, the client confidential data frontend 104 is also located on the server-side or cloud platform 107.

There may be various different potential implementations of the confidential data frontend 104, depending upon the type and configuration of the client device 102. In an example embodiment, the confidential data frontend 104 may be a web page that is served to a web browser operating on the client device 102. The web page may include various scripts, such as JavaScript code, in addition to HyperText Markup Language (HTML) and Cascading Style Sheets (CSS) code designed to perform various tasks that will be described in more detail below. The web page may be served in response to the user selecting a link in a previous communication or web page. For example, the link may be displayed in an email communication to the user, or as part of a feed section of a user's social networking service member page. This allows the entity operating the system 100 to selectively target users to request that they submit confidential information. For example, the entity may determine there is a need to obtain more salary information for users from Kansas and then may send out communications to, or cause the social networking service to alter feeds of, users in a manner that allows the users to select the link to launch the confidential data frontend 104.

In another example embodiment, the confidential data frontend 104 may be built into an application installed on the client device 102, such as a stand-alone application running on a smartphone. Again this confidential data frontend 104 is designed to perform various tasks that will be described in more detail below.

One task that the confidential data frontend 104 may be designed to perform is the gathering of confidential data from a user of the client device 102. Another task that the confidential data frontend 104 may be designed to perform is to display insights from confidential data contributed by other users. Due to the reluctance of users to provide certain types of confidential data, in an example embodiment, a user may be encouraged to share confidential information by providing insights based on confidential information received from other users. Information that can be used to identify the other users, however, is not shared while providing these insights. As will be described in more detail, a mechanism to ensure that the contribution of confidential data is tracked is provided.

Once received from the user, the confidential data frontend 104 may transmit the confidential data along with an identification of the user (such as a member identification reflecting the user's account with a social networking service) to the confidential data backend 106. In an example embodiment, this may be performed via, for example, a REST Application Program Interface (API).

The confidential data, along with the identification of the user, may be stored in a submission table by the confidential data backend 106 in the confidential information database 108. In some example embodiments, this submission table may be encrypted in order to ensure security of the information in the submission table. Furthermore, in some example embodiments, the confidential data stored in the submission table may be encrypted using a different key than the identifying information in the submission table. This encryption will be described in more detail below.

In another example embodiment, a random transaction number is generated for each confidential data submission. This random transaction number is stored with the identifying information in one table, and then stored with the confidential data in another table, with each table encrypted separately using a different key. In either this example embodiment or the previous example embodiment, encrypting the identifying information separately from the confidential data (either in one table or in separate tables) provides added security against the possibility that a malicious user could gain access to one or the other. In other words, even if a malicious user gained access to the identifying information by, for example, hacking the encryption used to encrypt the identifying information, that would not allow the malicious user to gain access to the compensation data corresponding to the identifying information, and vice versa. In an example embodiment, the encryption mechanism used is one that is non-deterministic, such that the same information encrypted twice would produce different results in each encryption. In another example embodiment, the transaction number itself is also encrypted, thereby preventing even the act of joining separate tables containing the identifying information and the confidential data.

In an example embodiment, a submission table may also be able to track when submissions were made by users. As such, the submission table may include additional columns such as, for example, a submission identification, an identification of the user who made the submission, an encryption key for the submission, and timestamp information about when the submission was made. The submission table may then be utilized by the confidential data backend 106 to determine, for example, when to share insights from submissions from other users to a particular user. If for example, the user has not previously submitted confidential data or has not submitted confidential data within some predetermined time period (e.g., within the last year), then the confidential data backend 106 may indicate to the confidential data frontend 104 that it should not share insights from confidential data from other users with this particular user until this particular user submits confidential data (or submits updated confidential data in the case where the particular user had submitted confidential data previously).

There may be other methods for determining eligibility of a user for receiving insights from submissions from other users than those described above. For example, a predicate expressed in terms of one or more attributes may need to be satisfied in order to receive the insights, such as particular demographic or profile-based attributes. These attributes can include any such attribute, from location to title, to level of skill, to social networking service activities or status (e.g., about to transition from being an active member to an inactive member) to transactional attributes (e.g., purchased a premium subscription).

Additionally, any combination of the above factors can be used to determine whether the user is eligible for receiving insights from submissions from other users.

As will be described in more detail below, in an example embodiment, a machine learning algorithm may be used to determine when a user is eligible to receive insights from confidential data submissions from other users. Specifically, the machine learning algorithm may be used to train an engagement model that uses one or more of the various factors described above as features to generate an engagement score for a particular user. This engagement score may be a representation of the likelihood that a user who is provided with insights from confidential data submissions from other users will engage more with a social networking service, either with or without the user having submitted his or her own confidential data. The engagement score may then be compared with a threshold to determine whether the user should be provided with the insights from confidential data submissions from other users. Alternatively, or in conjunction with this, the engagement score may then also be used to determine users from which to solicit confidential data.

Furthermore, the submission table may also include one or more attributes of the user that made the submission. These attributes may be attributes that can be useful in determining a slice to which the user belongs. Slices will be described in more detail below, but generally involve a segment of users sharing common attributes, such as titles, locations, educational level, and the like. It should be noted that it is not necessary for these attributes to be stored in the submission table. Since an identification of the user is available in the submission table, it may be possible to retrieve the attributes for the user on an as needed basis, such as by querying a social networking service with the user identification when needed.

A databus listener 110 then detects when new confidential data is added to the confidential information database 108 and triggers a workflow to handle the new confidential data. First, it queries a thresholds data store 116 to determine if one or more thresholds for anonymization have been met. Specifically, until a certain number of data points for confidential data have been met, the system 100 checks to ensure a certain number of data points for confidential data have been met before providing insights gleaned from the data. As will be described in more detail later, these thresholds may be created on a per-slice basis. Each slice may define a segment of users upon which insights may be gathered based on data points from confidential data submitted by users in the slice. For example, one slice may be users with the title "software engineer" located in the "San Francisco Bay Area," If, for example, the confidential data is compensation information, then it may be determined that in order to gain useful insights into the compensation information for a particular title in a particular region, at least 10 data points (e.g., compensation information of 10 different users) are needed. In this case, the threshold for "software engineer" located in "San Francisco Bay Area" may be set at 10, The databus listener 110, therefore, retrieves the confidential data added to the confidential information database 108, retrieves the threshold for the slice corresponding to attributes of the user (as stored, for example, in the submission table in the confidential information database 108 or retrieved at runtime from a social networking service), determines if the new data point(s) cause the threshold for the corresponding slice to be transgressed, and, if so, or if the threshold had already been exceeded, inserts the data in a backend queue 112 for extract, transform, and load (ETL) functions.

In an example embodiment, the thresholds data store 116 contains not just the thresholds themselves but also maintains a running count of how many data points have been received for each slice. In other words, the thresholds data store 116 indicates how close the slice is to having enough data points with which to provide insights. The databus listener 110 may reference these counts when making its determination that a newly submitted data point causes a threshold to be transgressed. Running counts of data points received for each slice are updated in thresholds 116 by confidential data backend 106.

Since the databus listener 110 only transfers data points for a particular slice to the backend queue 112 once the threshold for that slice has been transgressed, the confidential data data points corresponding to that slice may need to be retrieved from the confidential information database 108 once the threshold is determined to be transgressed. For example, if, as above, the threshold for a particular slice is 10 data points, the first nine data points received for that slice may simply be left in the confidential information database 108 and not sent to the backend queue 112. Then, when the tenth data point for the slice is stored in the confidential information database 108, the databus listener 110 may determine that the threshold has been transgressed and retrieve all 10 data points for the slice from the confidential information database 108 and send them to the backend queue 112 for processing.

It should be noted that the information obtained by the databus listener 110 from the confidential information database 108 and placed in the backend queue 112 is anonymized. In an example embodiment, no identification of the users who submitted the confidential data is provided to the backend queue 112. Indeed, in some example embodiments, the information provided to the backend queue may simply be the confidential data itself and any information needed in order to properly group the confidential data in one or more slices. For example, if slices are designed to group user confidential data based only on user title, location, and years of experience, other attributes for the user that might have been stored in the confidential information database 108, such as schools attended, may not be transferred to the backend queue 112 when the confidential data tied to those attributes are transferred to the backend queue 112. This further helps to anonymize the data, as it makes it more difficult for people to be able to deduce the identity of a user based on his or her attributes.

It should also be noted that any one piece of confidential data may correspond to multiple different slices and thus the databus listener 110 may, in some example embodiments, provide the same confidential data to the backend queue 112 multiple times. This can occur at different times as well, because each of the slices may have their own threshold that may be transgressed at different times based on different counts. Thus, for example, compensation data for a user in the San Francisco Bay Area with a job title of "software developer" and a school attended as "Stanford University" may be appropriately assigned to one slice of software developers in the San Francisco Bay area, a slice of "Stanford University" alums, and a slice of software developers in the United States. The slices may have their own thresholds and counts from confidential data from other users, who may or may not have complete overlap with these three slices.

An ETL backend 114 acts to extract, transform, and load the confidential data to anonymize and group it and place it back in the confidential information database 108 in a different location than it was stored in non-anonymized form. It should be noted that in some example embodiments, the anonymization described above with respect to the databus listener 110 may actually be performed by the ETL backend 114. For example, the databus listener 110 may send non-anonymized confidential data along with all attributes to the backend queue; and it may be the ETL backend 114 that reviews this data and discards certain elements of it to anonymize it.

In an example embodiment, the confidential information is stored in encrypted format in the confidential information database 108 when the databus listener 110 sends it to the backend queue 112. As such, one function of the ETL backend 114 is to decrypt the confidential information. Encryption and decryption of the confidential data will be discussed in more detail below.

The ETL backend 114 writes the anonymized confidential data and slice information into an ETL table corresponding to the slice in the confidential information database 108. As described earlier, this ETL table may be stored in a different location than the confidential data was stored initially, such as the submission table described earlier.

At a later time, and perhaps using a batch or other periodic process, the information from the ETL table may be loaded in a distributed file system (DFS) 118. A confidential data relevance workflow 120 may then extract relevant information from the DFS and provide one or more insights on the relevant information in a confidential data insights data store 122. A confidential data relevance API 124 may then be utilized to provide insights from the confidential data insights data store 122 to the confidential data frontend 104, which can then display it to a user. As described earlier, these insights may be provided only on a "give-to-get" basis, namely that only users who provide confidential information (and/or provide it recently) can view insights. More generally, the machine learned score described earlier can be used to determine eligibility of a user to be shown the insights.

Figure 2A:
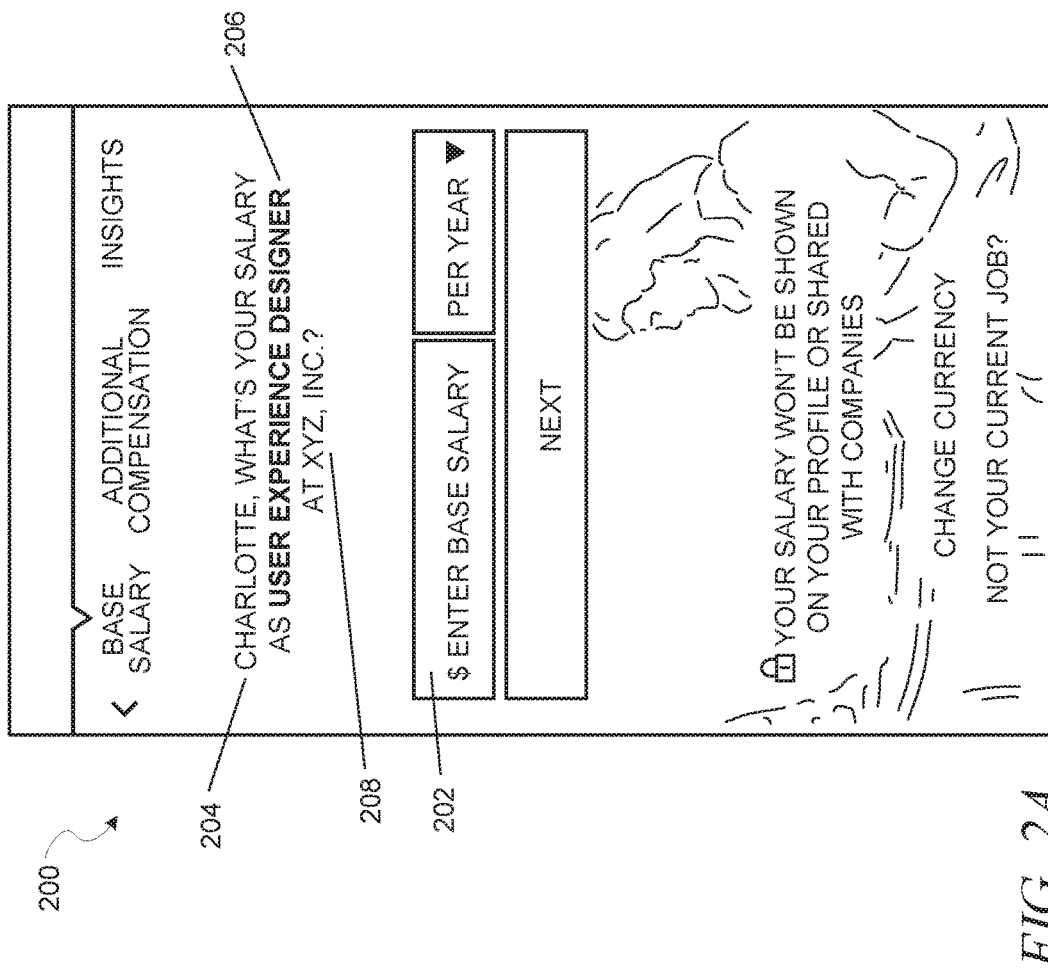
FIGS. 2A-2C are screen captures illustrating an example of a user interface provided by the confidential data frontend, in accordance with an example embodiment.
Figure 2B:
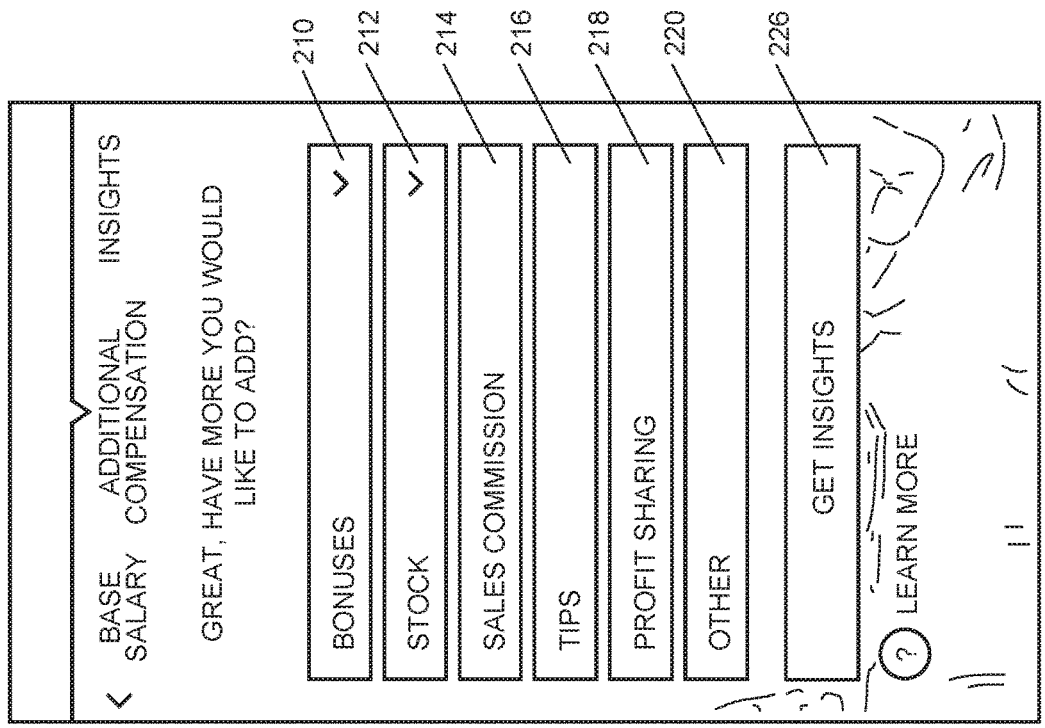
Figure 2C:
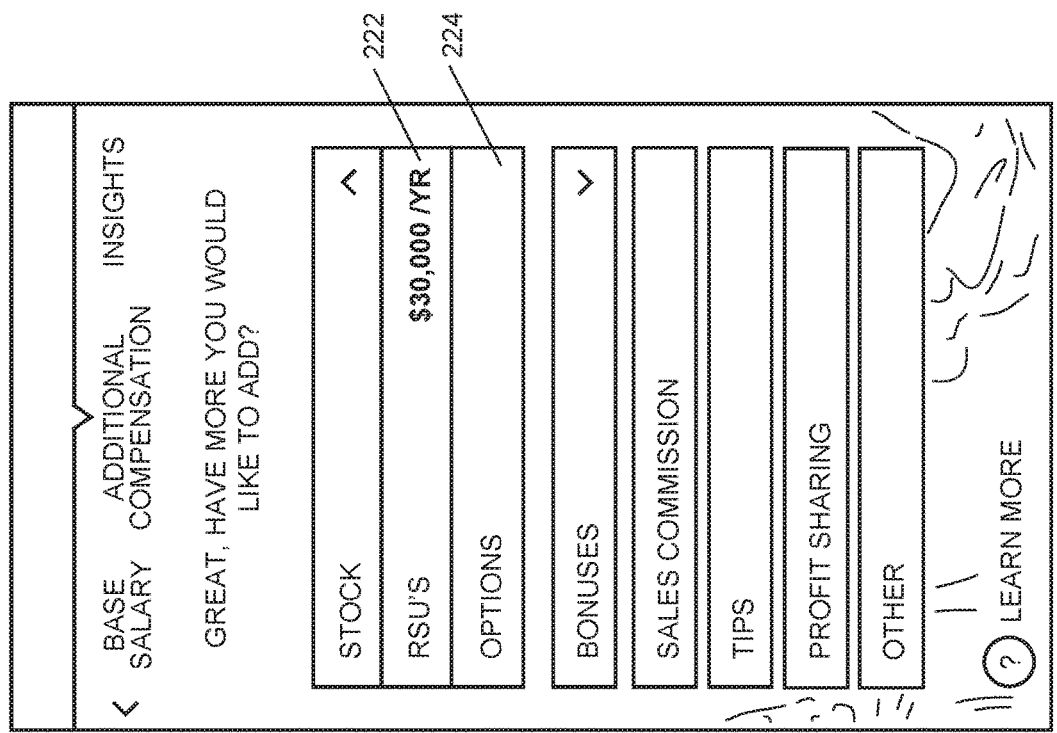

Turning now to more detail about the submission process, FIGS. 2A-2C are screen captures illustrating an example of a user interface 200 provided by the confidential data frontend 104, in accordance with an example embodiment. Referring first to FIG. 2A, the user interface 200 here is depicted as a screen of a stand-alone application operating on a mobile device, such as a smartphone. In FIG. 2A, the user is prompted to enter a base salary in text box 202, with a drop down menu providing options for different time periods on which to measure the base salary (e.g., per year, per month, per hour, etc.). Additionally, the user may be identified by name at 204, the user's title may be identified at 206, and the user's current employer may be identified at 208. This information may be prepopulated into the user interface 200, such as by retrieving this information from a member profile for the user in a social networking service. This eliminates the need for the user to enter this information manually, which can have the effect of dissuading some users from providing the confidential information or by completing the submission process, especially on a mobile device where typing or otherwise entering information may be cumbersome.

Turning to FIG. 2B, here the user interface 200 displays a number of other possible compensation types 210-220 from which the user can select. Selecting one of these other possible compensation types 210-220 causes the user interface 200 to provide an additional screen where the user can submit confidential data regarding the selected compensation type 210-220. Here, for example, the user has selected "Stock" 212. Referring now to FIG. 2C, the user interface 200 then switches to this screen, which allows the user to provide various specific details about stock compensation, such as restricted stock unit (RSU) compensation 222 and options 224. The user interface 200 at this stage may also display the other compensation types 210-220 for which the user can make additional submissions.

Referring back to FIG. 2B, when the user has completed entering all the confidential data, such as all the different compensation types appropriate for his or her current job, a "Get insights" button 226 may be selected, which launches a process by which the confidential data backend 106 determines whether the user is eligible to receive insights from compensation data from other users and, if so, indicates to the confidential data backend 106 that the insights should be provided. Additionally, selection of the "Get insights" button 226 represents an indication that the submission of the confidential data by this user has been completed, causing the confidential data backend 106 to store the confidential data in the confidential information database as described below, which then may trigger the databus listener 110 to extract the confidential information and cause the ETL backend 114 to anonymize the confidential data and place it in the appropriate ETL tables corresponding to the appropriate slices in which the confidential data belongs. This permits the submitted confidential data to be available for future insights.

Figure 3:
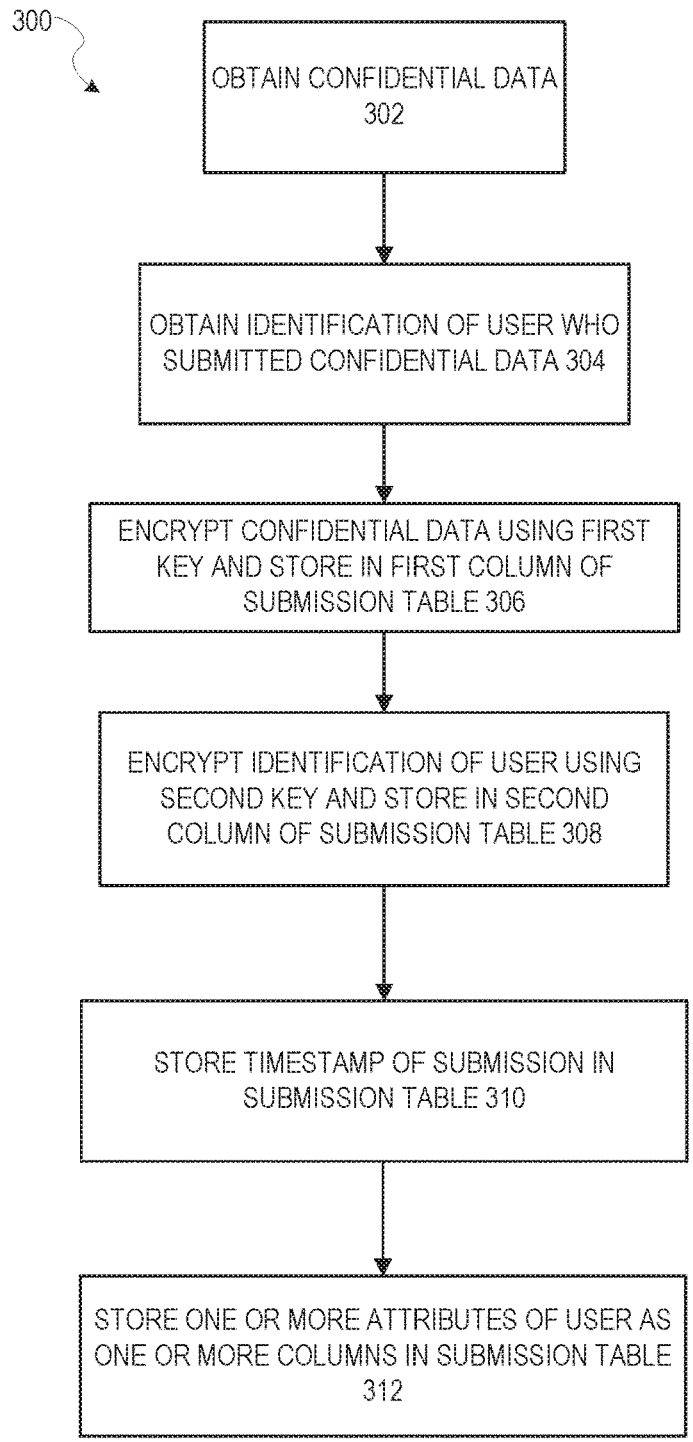
FIG. 3 is a flow diagram illustrating a method for confidential data collection and storage, in accordance with an example embodiment.

FIG. 3 is a flow diagram illustrating a method 300 for confidential data collection and storage, in accordance with an example embodiment. In an example embodiment, this method 300 may be performed by the confidential data backend 106 of FIG. 1. At operation 302, confidential data is obtained. At operation 304, an identification of the user who submitted the confidential data is obtained. It should be noted that while operations 302 and 304 are listed separately, in some example embodiments they may be performed in the same operation. For example, in an example embodiment, the confidential data frontend 104 may, upon receiving an indication from a user that input of confidential data in the confidential data frontend 104 by the user has been completed, forward the inputted confidential data and an identification of the user to the confidential data backend 106. In other example embodiments, however, the operations 302, 304 may be performed separately. For example, in an example embodiment, the identification of the user may not be obtained directly from the confidential data frontend 104, but rather some other type of identifying information may be obtained directly from the confidential data frontend 104, and this other type of identifying information may be used to query a social networking service or other third party service for the identification information for the user. Regardless, after operations 302 and 304 have been performed, the confidential data backend 106 now has at its disposal some confidential data and identification information for the user who entered the confidential data.

It should be noted that the confidential data may either be a single piece of information or may be multiple related pieces of information. For example, the confidential data may simply include a total compensation value and nothing more, or may include a complete breakdown of different types of compensation (e.g., base salary, bonus, stock, etc.).

Users are understandably concerned about the security of the confidential information, and specifically about a malicious user being able to correlate the confidential information and the identification of the user (i.e., not just learning the confidential information but tying the confidential information specifically to the user). As such, at operation 306, the confidential data is encrypted using a first key and stored in a first column of a submission table in a confidential information database. Then at operation 308, the identification of the user who submitted the confidential data is separately encrypted using a second key and stored in a second column of the submission table in the confidential information database.

Additionally, a number of optional pieces of information may, in some example embodiments, be stored in the submission table at this point. At operation 310, a timestamp of the submission of the confidential data may be stored in a column in the submission table. This timestamp may be used in, for example, a determination of whether the user is eligible to receive insights from confidential data submitted by other users. At operation 312, one or more attributes of the user may be stored as one or more columns in the submission table. These attributes may be used, for example, in determining to which slice(s) the confidential data may apply, as will be described in more detail below.

Figure 4:
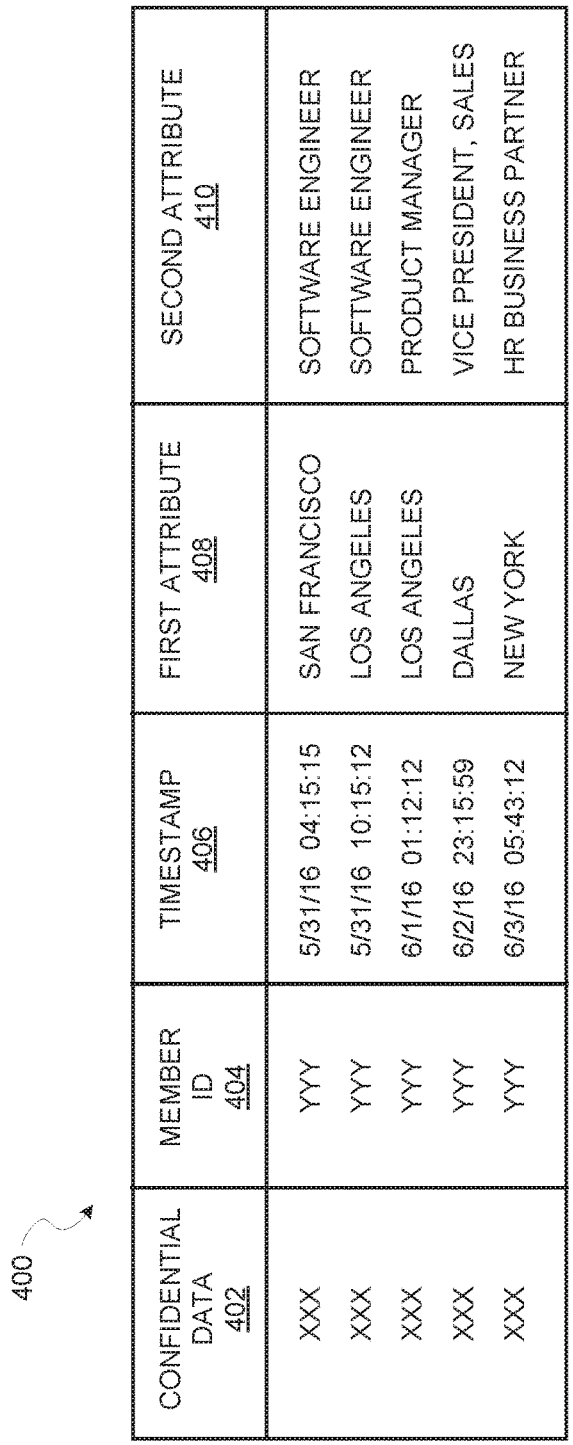
FIG. 4 is a diagram illustrating an example of a submission table, in accordance with an example embodiment.

FIG. 4 is a diagram illustrating an example of a submission table 400, in accordance with an example embodiment. Each row in the submission table 400 corresponds to a different submission. Here, the submission table 400 includes five columns. In a first column 402, confidential data encrypted by a first key is stored. In a second column 404, identification of the user who submitted the corresponding confidential data, encrypted by a second key, is stored. In a third column 406, a timestamp for submission is stored. In a fourth column 408, a first attribute of the user, here location, is stored. In a fifth column 410, a second attribute of the user, here title, is stored. Of course, there may be additional columns to store additional attributes or other pieces of information related to the submission.

Notably, FIG. 4 depicts an example embodiment where only the first and second columns 402, 404 are encrypted, using different encryption keys. In some example embodiments, the additional columns 406-410 may also be encrypted, either individually or together. In some example embodiments one or more of these additional columns 406-410 may be encrypted using the same key as the first or second column 402, 404. Furthermore, in some example embodiments, the submission table 400 may be additionally encrypted as a whole, using a third encryption key different from the keys used to encrypt the first and second columns 402, 404.

It should be noted that while FIGS. 3 and 4 describe the confidential data as being stored in a single column in a submission table, in some example embodiments, this column is actually multiple columns, or multiple sub-columns, with each corresponding to a subset of the confidential data. For example, if the confidential data is compensation information, the confidential data may actually comprise multiple different pieces of compensation information, such as base salary, bonus, stock, tips, and the like. Each of these pieces of compensation information may, in some example embodiments, have its own column in the submission table. Nevertheless, the processes described herein with regard to the "column" in which the confidential data is stored apply equally to the embodiments where multiple columns are used (e.g., the individual pieces of compensation information are still encrypted separately from the user identification information).

Figure 5:
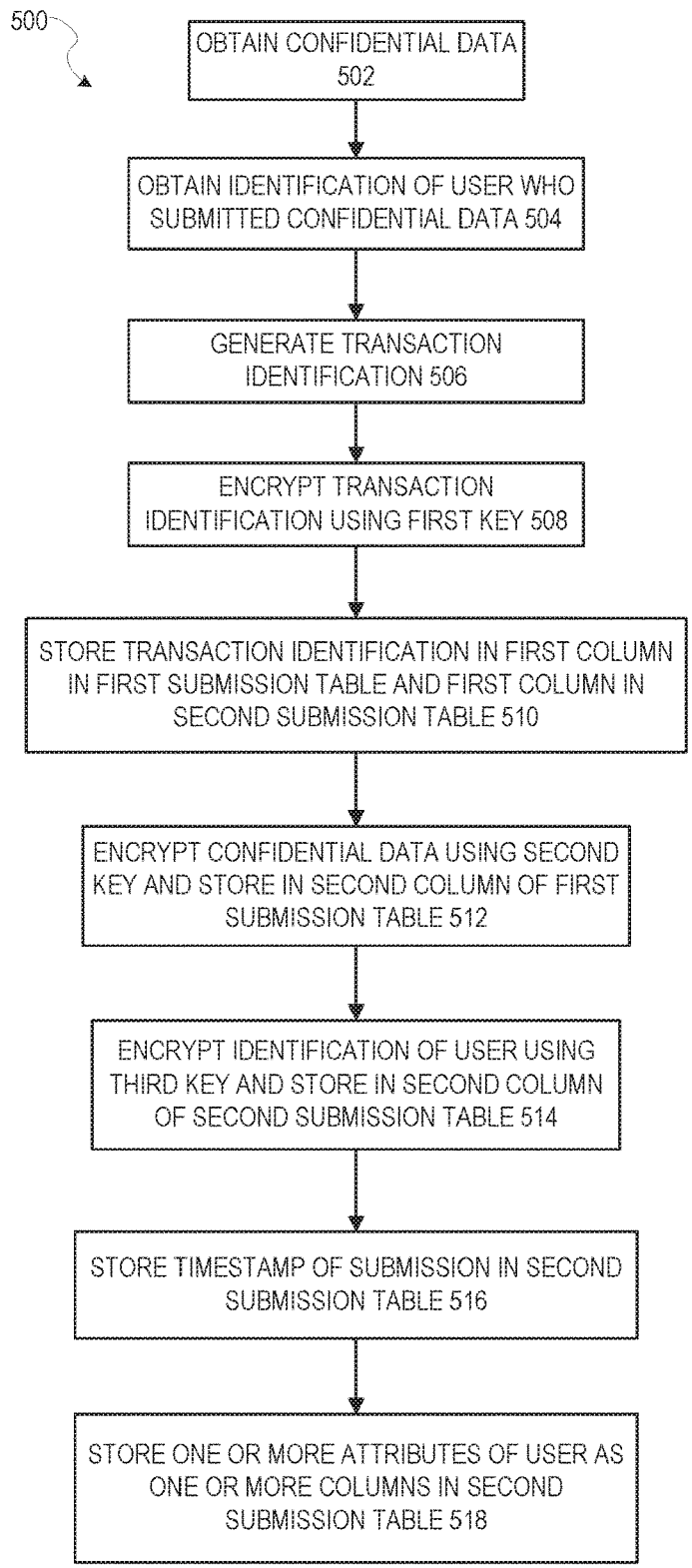
FIG. 5 is a flow diagram illustrating a method for confidential data collection and storage, in accordance with an example embodiment.

FIG. 5 is a flow diagram illustrating a method 500 for confidential data collection and storage, in accordance with an example embodiment. In contrast with FIG. 3, FIG. 5 represents an example embodiment where the confidential data and the identification of the user who submitted the confidential data are stored in separate tables in order to provide additional security. At operation 502, confidential data is obtained. At operation 504, an identification of the user to which the confidential data applies is obtained. As in FIG. 3, while operations 502 and 504 are listed separately, in some example embodiments they may be performed in the same operation.

At operation 506, a transaction identification is generated. This transaction identification may be, for example, a randomly generated number or character sequence that uniquely identifies the submission. At operation 508, the transaction identification may be encrypted using a first key. At operation 510, the transaction information (either encrypted or not, depending upon whether operation 508 was utilized) is stored in a first column in a first submission table and in a first column in a second submission table in a confidential information database.

At operation 512, the confidential data is encrypted using a second key and stored in a second column of the first submission table in the confidential information database. Then, at operation 514, the identification of the user who submitted the confidential data is separately encrypted using a third key and stored in a second column of the second submission table in the confidential information database.

Additionally, as in FIG. 3, a number of optional pieces of information may, in some example embodiments, be stored in the first and/or second submission tables at this point. At operation 516, a timestamp of the submission of the confidential data may be stored in a column in the second submission table. This timestamp may be used in, for example, a determination of whether the user is eligible to receive insights from confidential data submitted by other users. At operation 518, one or more attributes of the user may be stored as one or more columns in the second submission table. These attributes may be used, for example, in determining to which slice(s) the confidential data may apply, as will be described in more detail below. It should be noted that while operations 516 and 518 are described as placing information in the second submission table, in other example embodiments, one or more of these pieces of information may be stored in the first submission table.

If operation 508 is utilized, then the fact that the transaction identification is encrypted and is the only mechanism by which to link the confidential data in the first submission table with the user identification in the second submission table through a join operation provides an additional layer of security.

FIG. 6 is a diagram illustrating an example of a first submission table 600 and second submission table 602, in accordance with an example embodiment. Each row in each of the first and second submission tables 600, 602 corresponds to a different submission. Here, the first submission table 600 includes two columns. In a first column 604, transaction identification information encrypted by a first key is stored. In a second column 606, confidential data encrypted by a second key is stored.

The second submission table 602 includes five columns. In a first column 608, transaction identification information encrypted by a first key is stored. In a second column 610, identification of the user who submitted the corresponding confidential data, encrypted by a third key, is stored. In a third column 612, a timestamp for submission is stored. In a fourth column 614, a first attribute of the user, here location, is stored. In a fifth column 616, a second attribute of the user, here title, is stored. Of course, there may be additional columns to store additional attributes or other pieces of information related to the submission.

Notably, FIG. 6 depicts an example embodiment where only the first and second columns 608, 61.0 of the second submission table 602 are encrypted, using different encryption keys. In some example embodiments, the additional columns 612-616 may also be encrypted, either individually or together. Furthermore, in some example embodiments, the first and/or second submission tables 600, 602 may be additionally encrypted as a whole, using an additional encryption key(s) different from the keys described previously.

It should be noted that while FIGS. 5 and 6 describe the confidential data as being stored in a single column in a first submission table; in some example embodiments this column is actually multiple columns, or multiple sub-columns, with each corresponding to a subset of the confidential data. For example, if the confidential data is compensation information, the confidential data may actually comprise multiple different pieces of compensation information, such as base salary, bonus, stock, tips, and the like. Each of these pieces of compensation information may, in some example embodiments, have its own column in the first submission table. Nevertheless, the processes described herein with regard to the "column" in which the confidential data is stored apply equally to the embodiments where multiple columns are used (e.g., the individual pieces of compensation information are still encrypted separately from the user identification information).

As described earlier, the collection flow (e.g., the sequence of screens presented in a user interface to the member when the member is submitting confidential data) may be prepopulated with known attributes of the member. For example, referring back to FIG. 2, the member's title 206 and employer 208 may be extracted from a member profile associated with the member and prepopulated into the confidential data submission screen. The user may then elect to modify these attributes if so desired prior to completing the submission process (e.g., if the member has changed titles since the last update was made to the member profile). This type of prepopulation may be relatively straightforward if the member profile or other data source has information about the attribute for this particular member, however in the real world this can oftentimes not be the case. Member profiles, for example, are often incomplete, where members leave blanks in fields where attribute data would ordinarily be placed. One solution, of course, would just be to prompt the member during the collection flow for submission of this missing attribute information, but this adds additional time and complexity to the collection flow process, and may cause some members to quit the collection flow process prior to the collection flow being completed (e.g., before submitting the confidential data). The smaller screens and difficult user input mechanisms on mobile devices, for example, can make it more difficult for users to input data, increasing the likelihood that members will abandon the collection flow prior to completion, and this likelihood increases with each additional piece of information the member is required to provide.

Referring back to FIG. 1, the databus listener 110 may utilize information received from the confidential data frontend 104 to query one or more services for attributes. One of these services may be member services 126, which may be queried using a member identification provided by the confidential data frontend 104 and return one or more attributes from a member profile in a social networking service. Another of these services may be a standardization service 128, which may receive an attribute value (either obtained directly from the confidential data frontend 104 or obtained from one of services 126, 128) and return a standardized version of that attribute. For example, the standardization service 128 may take an actual title as input and return a standardized version of that title. The actual title may have either been, for example, input by the user to the confidential data frontend 104, or retrieved as part of the member profile from the member services 126. A company details service (not pictured) may take a company identification or name as input and return details about that company for inclusion as derived attributes.

Other attributes may be added as part of an offline join between the submission table and other tables in other databases containing attributes. For example, member usage data such as how often a member interacts with a social networking service and how complete the member's profile is may be stored in offline databases that are not queryable in real time using, for example, an API. This type of attribute may be obtained using this offline mechanism in a batch mode.

In an example embodiment, attributes useful to the collection flow of confidential data are inferred for members of a social networking service. It should be noted that while FIG. 2A depicts title 206 and employer 208 as collected attributes, the inferring of attributes may be performed for any attributes of a member that may be useful in the determining a slice to which the user belongs, and may be stored in a submission table just as if the member him or herself had specified the attribute.

In an example embodiment, any attributes that are not available in the member profile or other known data source may be inferred using an attribute inference model trained by a machine learning algorithm. This attribute inference model may be trained to, for example, output a confidence value associated with the prediction for each attribute value. The collection flow may then be personalized based on these predicted attribute values and corresponding confidence scores.

Figure 7:
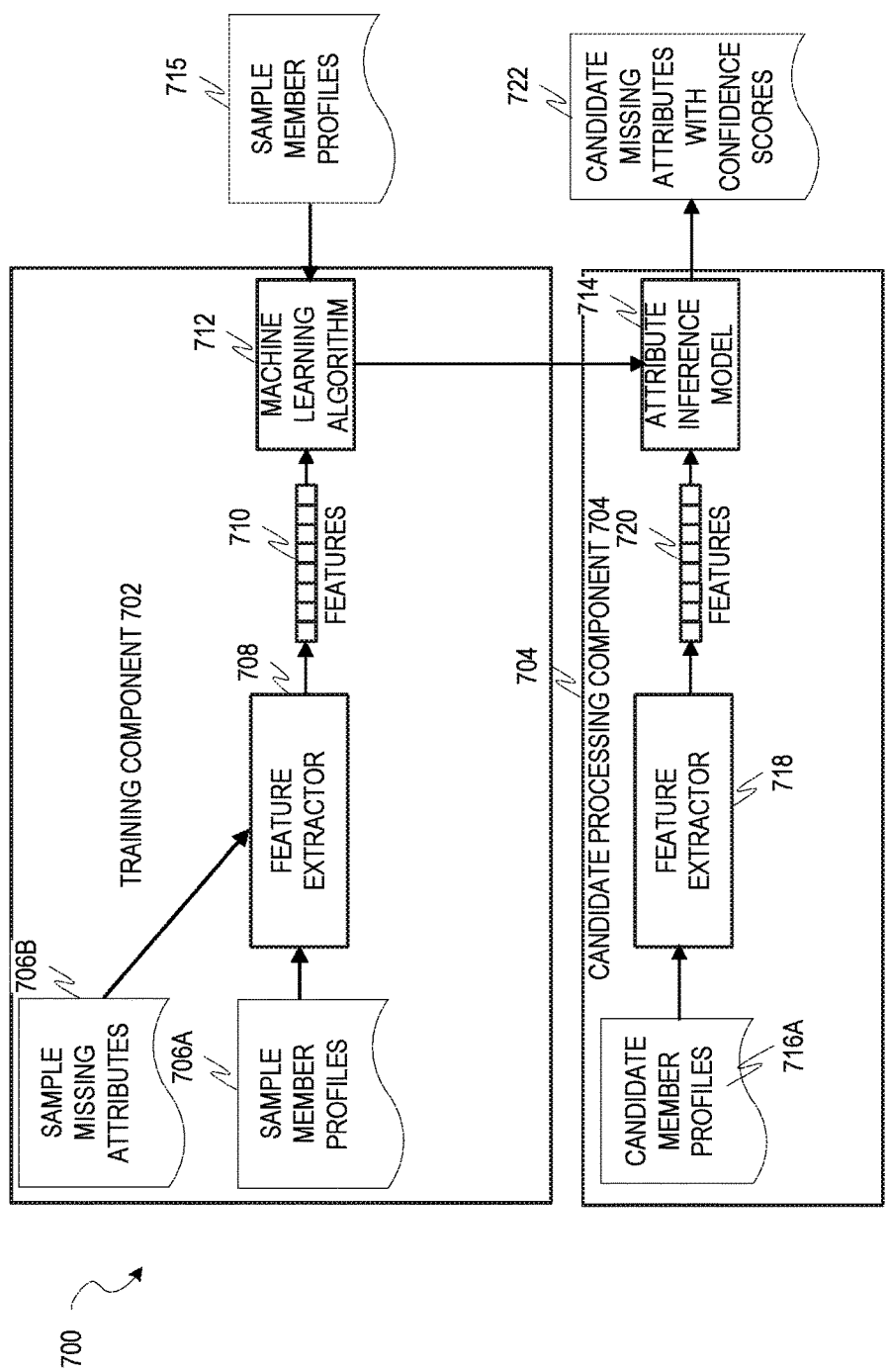
FIG. 7 is a block diagram illustrating a system for performing machine learning to train an attribute inference model in accordance with an example embodiment.

FIG. 7 is a block diagram illustrating a system 700 for performing machine learning to train an attribute inference model in accordance with an example embodiment. The system 700 may be contained in, for example, the confidential data frontend 104 or the confidential data backend 106 of FIG. 1.

The system 700 may comprise a training component 702 and a candidate processing component 704. The training component 702 feeds sample member profiles 706A and sample missing attributes 706B into a feature extractor 708 that extracts one or more features 710. The features 710 are measurements useful in determining missing attribute values to recommend and confidence scores related to those missing attribute values. A machine learning algorithm 712 produces the attribute inference model 714 using the extracted features 710 along with, for example, one or more labels 715 indicating confidence values for corresponding sample missing attributes 706B. In the candidate processing component 704, candidate member profiles 716A are fed to a feature extractor 718 that extracts one or more features 720. In an example embodiment, features 720 are identical to the features 710, although the values for the features will of course vary. These features 720 are then fed to the attribute inference model 714, which outputs candidate missing attribute values along with corresponding confidence scores 722.

The candidate missing attribute values and corresponding confidence scores 722 may then be used to automatically add attribute values for the member to the submission table and/or perform other modifications to the collection flow of confidence data from the member. In one example embodiment, one or more thresholds are set for different functionalities. For example, missing attribute values with confidence scores greater than 98% may be automatically added to the submission tables, missing attribute values with confidence scores between 85% and 98% may be prepopulated in the collection flow, giving the member a chance to alter the attribute values if incorrect, missing attribute values with confidence scores between 75% and 85% may generate individual pop-up windows to the member asking the member to confirm that the attribute values are accurate, and missing attribute values with confidence scores less than 75% are simply ignored.

It should be noted that the attribute inference model 714 may be periodically updated via additional training and/or user feedback.

The machine learning algorithm 712 may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck method.

The training component 702 may operate in an offline manner to train the attribute inference model 714. The candidate processing component 704, however, may be designed to operate in either an offline manner or an online manner.

Furthermore, while the above describes extracting features from member profiles (either sample or candidate), in some example embodiments other data sources may also be used to provide relevant features. For example, member usage data indicating usage of the social networking service by the member may be relevant.

Examples of features 710, 720 that may be useful in training the model and generating confidence scores at runtime include, for example, various types of co-occurrence of attribute values with attribute values already in the member profile (e.g., if members having skills A, B, and C usually also have skill D, a member having skills A, B, and C may be more likely to be inferred to have a missing attribute value of skill D, or if members working at company XYZ with skills A, B, and C typically have the title "software engineer", a member having skills A, B, and C at company XYZ may be more likely to have a title of "software engineer" inferred if the title is left blank).

In some examples, the system may calculate a probability matrix for each individual attribute which calculates, given a member's particular attribute values for that attribute, the probability that the member has an attribute value of interest. These individual probability vectors may then be normalized, weighted, and combined to yield a final probability. This final probability describes the probability that the member has that particular attribute value of interest. If the probability that the member possesses a given attribute value is high enough, the system may infer that the member possesses the given attribute value. For ease of description, an attribute comprises a type or category of information whereas an attribute value comprises the actual value of that attribute. For example, an attribute may be a company name, a geographical location, an educational institution, or the like. Actual attribute values include actual company names (e.g., LinkedIn), actual geographical locations (e.g., San Jose, Calif.), and actual educational institutions (e.g., Harvard).

In some examples, the system may use multiple attribute values of various attributes the system knows about a member (e.g., member profile data, interaction data, or the like) to generate a missing attribute value by generating a composite probability that a member may possess a certain skill based upon the individual probabilities for each attribute value. These probabilities may be weighted, normalized, and/or combined by Bayesian rules to generate a composite probability which describes a probability that a particular member possesses a particular skill.

Figure 8:
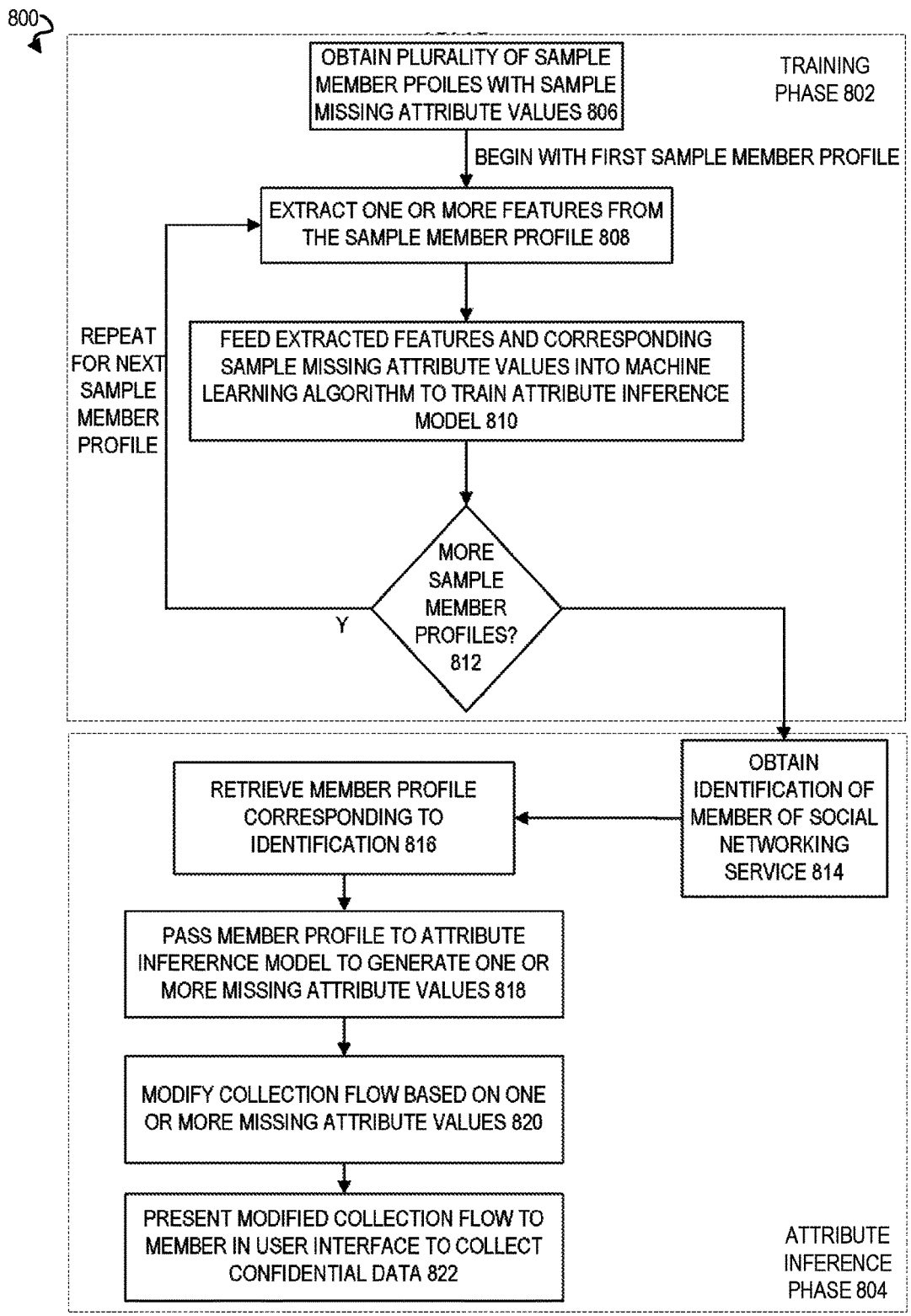
FIG. 8 is a flow diagram illustrating a method for modifying a collection flow of a user interface in accordance with an example embodiment.

FIG. 8 is a flow diagram illustrating a method 800 for modifying a collection flow of a user interface in accordance with an example embodiment. The method 800 may be comprised of two phases: a training phase 802 and an attribute inference phase 804. In the training phase 802, at operation 806, a plurality of sample member profiles with sample missing attribute values identifying attribute values missing from the sample member profiles are obtained. Then a loop is begun for each of the plurality of sample member profiles. At operation 808, one or more features are extracted from the sample member profile. Then at operation 810, the extracted one or more features and the corresponding sample missing attribute values are fed into a machine learning algorithm to train an attribute inference model to output missing attribute values based on the extracted one or more features. At operation 812, it is determined if there are any more sample member profiles. If so, then the method 800 loops back to operation 808 for the next sample member profile. If not, then the method 800 has finished the training phase 802.

In an attribute inference phase 804, at operation 814 an identification of a member of a social networking service is obtained. This may be performed in a number of ways. In a first example embodiment, the member has been invited to submit confidential data via a communication including a link. The link, when followed, may pass a member identification. In another example embodiment, the member may explicitly provide the identification at the beginning of the collection flow.

At operation 816, a member profile corresponding to the member of the social networking service is retrieved using the identification. At operation 818, the member profile is passed to the attribute inference model to generate one or more missing attribute values for the member profile. At operation 820, a collection flow, defined in a user interface of a computing device, is modified based on the generated one or more missing attribute values. The collection flow defines a sequence of screens for collecting confidential data. The modification may include, in cases where the attribute inference model outputs confidence scores, comparing, for each of the one or more missing attribute values, the confidence score to at least one threshold and modifying the collection flow for missing attribute values having confidence scores transgressing the at least one threshold.

At operation 822, the modified collection flow is presented to the member in the user interface to collect confidential data from the member. This confidential data may be added, for example, to a first submission table, while the attributes, including attributes actually contained in the member profile as well as missing attributes suggested by the attribute inference model or having confidence scores transgressing a threshold, are added to a second submission table (although as described earlier the first and second submission tables can, in some example embodiments, be the same table). The confidential data can be assigned to a slice table corresponding to a slice including the one or more missing attribute values in the second submission table.

While the above describes how confidential data is submitted, stored, and utilized, another issue that arises is how confidential data is gathered. In the system described above, members are incentivized to submit the confidential data with the promise of receiving statistical insights gathered from the confidential data submitted by other members. A cold start problem is encountered, however, wherein in the initial stages of gathering confidential data from members, there may not be enough gathered confidential data (or, at least, not enough gathered confidential data that is relevant to the member) in order to provide meaningful statistical insights.

While it is possible for members to sua sponte decide to submit confidential data, it perhaps is more common for such members to decide to submit confidential data after receiving some communication, such as an email from the social networking service or a pop-up window, inviting the member to submit the confidential data. In an example embodiment, these communications are controlled in a manner to maximize the availability to members of relevant statistical insights from confidential data submitted by other members.

As described above, the confidential data may be provided to one or more slices that are defined in terms of members sharing one or more attributes. A grouping of members sharing one or more attributes may be called a cohort. In an example embodiment, communications to invite members to submit confidential data are controlled on a cohort-by-cohort basis. Furthermore, in an example embodiment, members within a target cohort are divided into multiple waves, specifically at least two waves. The first wave generally includes members who will be shown delayed insights (i.e., not shown insights immediately or shortly after submitting their own confidential data), whereas the second wave generally includes members who will be shown insights without delay (i.e., be shown insights immediately or shortly after submitting their own confidential data).

For example, if the cohort is registered nurses in Chicago, there may 10,000 such registered nurses in Chicago. Inviting all 10,000 to submit confidential data at once results in a suboptimal experience for all 10,000, but if the first wave contains only 1,000 of the registered nurses while the second wave contains the other 9,000, if it is assumed that the first wave will likely provide enough confidential data to make insights relevant for the second wave, then the number of members who have suboptimal experiences when submitting the confidential data is limited to the 1,000 in the first wave, while 9,000 receive optimal experiences.

In an example embodiment the members in a targeted cohort are divided into the waves randomly. While one may be tempted to increase the likelihood that the first wave will submit confidential data and/or reduce the number of members in the first wave by intentionally populating the first wave with members who have a higher likelihood of submitting confidential data in response to an invitation (e.g., most active members, user profile data used to deduce higher likelihood of submitting members, etc.), such actions may skew the insights provided by the confidential data because the confidential data itself would then not be randomized (e.g., members who have a higher likelihood of responding may also be ones that have higher salaries).

Of course, this does not mean that all members of the social networking service who are within the targeted cohort are divided into either the first or second wave. Specifically, only eligible members of the targeted cohort are placed into one of the waves. There may be ineligible members who simply aren't invited to submit confidential data at all, such as members who have opted out of communications/invitations from the social networking service, and members who are blacklisted, such as those suspected to be fake or dummy accounts.

It should be noted that in some example embodiments the eligible members of the targeted cohort do not necessarily need to be distributed randomly among the waves. Since the goal may be to ensure an even distribution, it may be desirable to look at various attributes of the members and divide the members among the waves in a way that maximizes the distribution of members with similar attributes among the waves. For example, if 1,000 of the 10,000 registered nurses in Chicago are "power users" of the social networking service (e.g., highly active users), it may be desirable to have these 1,000 registered nurses divided among the waves in a manner that they are spread evenly. So if the first wave has 1,000 members (10% of the cohort total), then the system may ensure that 100 of the 1,000 members in the first wave are power users, while 900 of the 9,000 members of the second wave are power users. This prevents the possibility that a purely random selection might result in more or fewer of these power users being placed in each wave and potentially skewing the statistical insights from their submitted confidential data.

In an example embodiment, the distribution of the members among the waves may be dynamic. Specifically, a preliminary distribution of members into the first and second waves may be made based at least partially on an assumed response rate for the invitations to submit confidential data. This assumed response rate may be estimated based on a variety of factors, such as past history of response rates to similar invitations to similar cohorts. The number of members assigned to the first wave may be based on the assumed response rate along with a specified minimum number of responses (submitted pieces of confidential data) needed to provide relevant statistical insights about the confidential data in this targeted cohort. For example, if a minimum of 200 pieces of compensation data from registered nurses in Chicago is needed in order to provide relevant insights about compensation of registered nurses in Chicago, and the assumed response rate is 0.2, then the preliminary distribution places 1,000 members in the first wave.

However, this assumed response rate may or may not be accurate, and specifically there is concern that the actual response rate may be lower than the assumed response rate, resulting in fewer than 200 pieces of compensation data from registered nurses being gathered from the first wave of invitations. In order to compensate for possible inaccuracy of the assumed response rate, a first grouping of k1 members of the first wave may be examined within a particular time period of sending out invitations to the first wave. The response rate of this first grouping of k1 members may be measured as:

$$\Gamma = l1/k1$$

Where $\Gamma$ is the response rate and l1 is the number of responses from this first grouping.

Then, an additional number of members k2 from the preliminary distribution of the second wave are moved to the first wave and invitations sent to those k2 members (it should be noted that these members are still considered to be in the first wave because these members are provided with delayed insights, even though these members are sent invitations after the members of the preliminary distribution of the first wave had already been sent—in a sense they can be considered to be a second part of the first wave).

k2 may be computed as follows:

$$k2 = (\alpha/\Gamma) - k1$$

where $\alpha$ is the minimum number of pieces of confidential data needed to provide relevant statistical insights for this targeted cohort.

Once k2 is determined, in an example embodiment the remainder of the first wave (comprising k2 members) and all of the members of the second wave (comprising the total eligible members in the cohort minus k1 and minus k2) may be determined. Invitations may then be sent to the remaining k2 members of the first wave and then, after an appropriate amount of time to allow the members to respond with submissions of confidential data, invitations may be sent to the members of the second wave, under the assumption that there now have been enough submissions of confidential data in this targeted cohort to provide meaningful statistical insights.

In a variation of this example embodiment, the determination of the members of the first wave may be a continued iterative process. Specifically, it is not necessary for the first wave to be merely divided into a first group of k1 members and a second group of k2 members. The response rate from k2 can be similarly measured and, if necessary, an additional group of k3 members may be added. Likewise, the response rate for this additional group of k3 members may be measured and, if necessary, an additional group of k4 members may be added, and so on.

Additionally, in an example embodiment, the determination of k1 and k2 (and potentially additional k groups if needed) is enhanced by examining one or more attributes of the members of each group to see if any differences in attribute value may reflect a different response rate. For example, if one of the attributes of members of the social networking service is "engagement lever", which has potential values of "high," "medium," or "low," when measuring the response rate $\Gamma$ in the first group of k1 members of the first wave, the measurement may actually be broken up in to different values for the different subgroups of members of the first k1 members of the first wave, specifically $\Gamma_{high}$, $\Gamma_{med}$, and $\Gamma_{low}$. $\Gamma_{high}$ is the response rate for members of the first k1 members of the first wave that also have an engagement level of "high." $\Gamma_{med}$ is the response rate for members of the first k1 members of the first wave that also have an engagement level of "medium." $\Gamma_{low}$ is the response rate for members of the first k1 members of the first wave that also have an engagement level of "low."

A proportional number of eligible members having these different engagement levels may then be assigned to second group of k2 members of the second group of the first wave.

This may be performed using values from any attribute of the members, not just engagement level. Indeed, in more complex example embodiments various combinations of attributes of members may be used to create even more groupings (e.g., various permutations of values of engagement level and values of employer).

Figure 9:
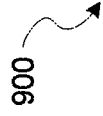
FIG. 9 depicts an example of measured engagement levels in subgroups of members of the first group of k1 members in the first wave of eligible members and their corresponding effects on k2 in accordance with an example embodiment.

FIG. 9 depicts an example of measured engagement levels in subgroups of members of the first group of k1 members in the first wave of eligible members and their corresponding effects on k2 in accordance with an example embodiment. Table 900 depicts columns for engagement level 902, number of members 904, responses 906, and response rate 908.

Figure 10:
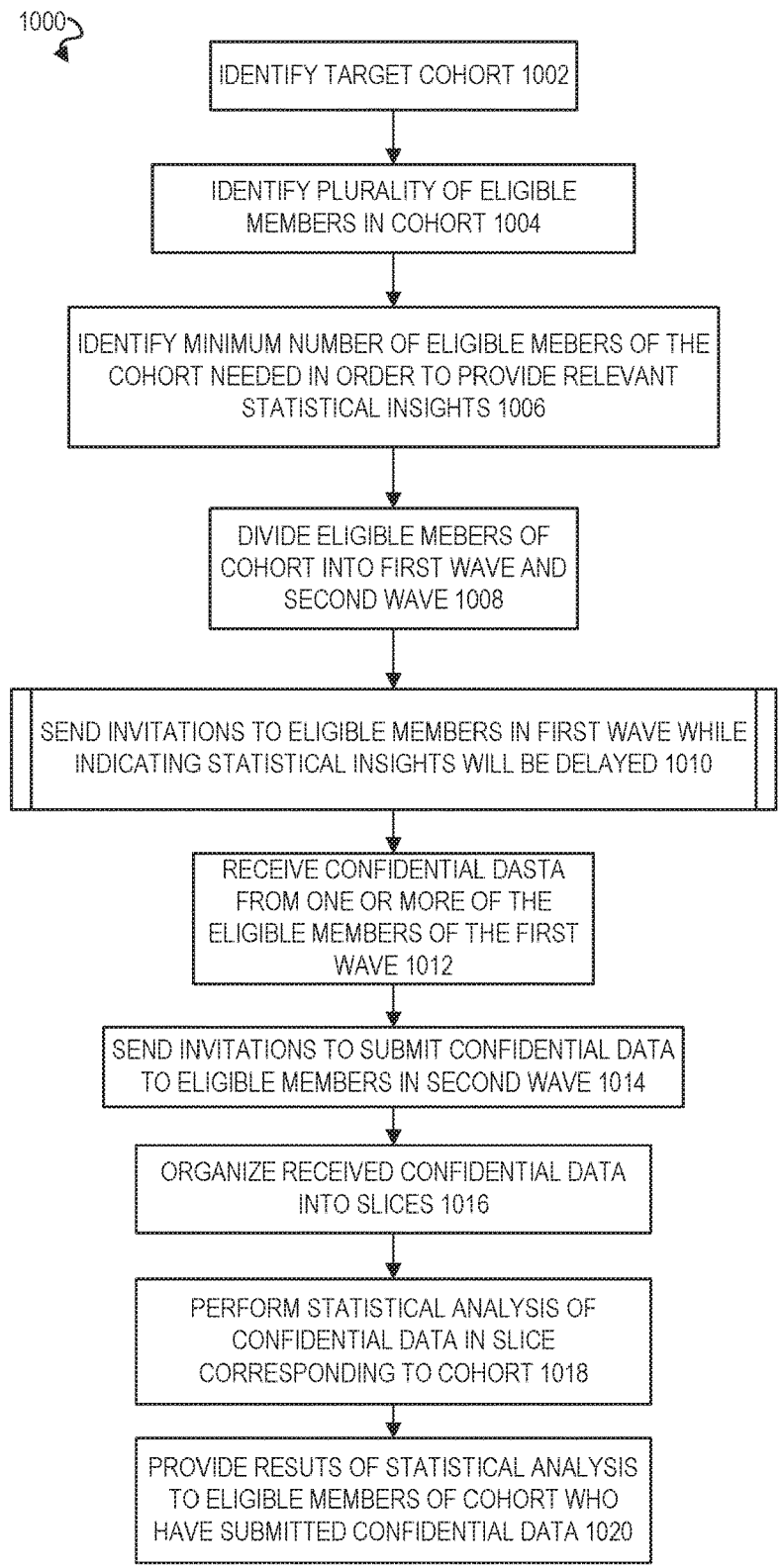
FIG. 10 is a flow diagram illustrating a method for obtaining confidential data from members of a social networking service in accordance with an example embodiment.

FIG. 10 is a flow diagram illustrating a method 1000 for obtaining confidential data from members of a social networking service in accordance with an example embodiment. At operation 1002, a cohort to target is identified. The cohort may include a plurality of members of a social networking service having member profiles that all share at least one attribute value. At operation 1004, a plurality of eligible members are identified from the plurality of members of the cohort. The eligible members are members eligible to receive an invitation to submit confidential data.

At operation 1006, a minimum number of eligible members of the cohort needed in order to provide relevant statistical insights from confidential data submitted by eligible members of the cohort are identified. At operation 1008, based on an assumed response rate for eligible members of the cohort, a total number of eligible members in the cohort, and the minimum number of eligible members of the cohort in order to provide relevant statistical insights, the eligible members in the cohort are divided into a first wave and a second wave.

At operation 1010, invitations to submit confidential data are sent to eligible members in the first wave while indicating statistical insights from confidential data submitted by eligible members of the cohort will be delayed. At operation 1012, confidential data is received from one or more of the eligible members in the first wave.

At operation 1014, invitations to submit confidential data are sent to eligible members in the second wave. At operation 1016, received confidential data are organized into slices organized by cohort. At operation 1018, statistical analysis of confidential data in a slice corresponding to the cohort is performed. At operation 1020, results of the statistical analysis are provided to eligible members of the cohort who have submitted confidential data.

Figure 11:
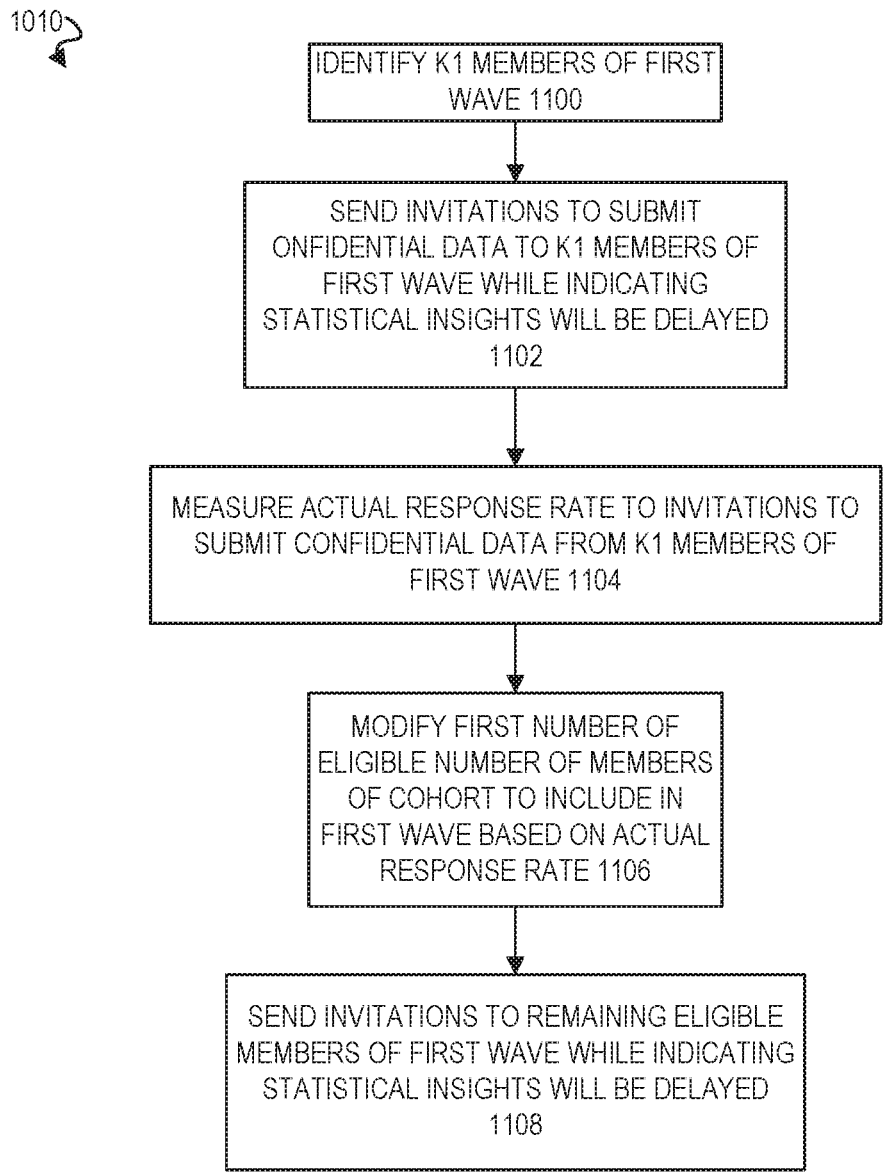
FIG. 11 is a flow diagram illustrating a method for sending invitations to submit confidential data to eligible members in the first wave in accordance with these example embodiments.

In some example embodiments, the dividing in operation 1008 includes initially identifying a first number of eligible members of the cohort to include in the first wave by dividing the assumed response rate by the minimum number of eligible members of the cohort in order to provide relevant statistical insights. In such embodiments, the sending invitations to submit confidential data to eligible members in the first wave in operation 1010 may be broken into a series of suboperations. FIG. 11 is a flow diagram illustrating a method 1010 for sending invitations to submit confidential data to eligible members in the first wave in accordance with these example embodiments. At operation 1100, k1 members of the first wave are identified. At operation 1102, invitations to submit confidential data are sent to the k1 members of the first wave while indicating statistical insights from confidential data submitted by eligible members of the cohort will be delayed. At operation 1104, actual response rate to the invitations to submit confidential data from the k1 members of the first wave is measured. At operation 1106, the first number of eligible number of members of the cohort to include in the first wave is modified based on the measured actual response rate to the invitations to submit confidential data from the k1 members of the first wave. At operation 1108, invitations to submit confidential data are sent to remaining eligible members in the first wave while indicating statistical insights from confidential data submitted by, eligible members of the cohort will be delayed. This includes any eligible members of the cohort that were recently added to the first wave by virtue of the modification of operation 1106.

The above describes how the waves may be seeded within a targeted cohort. There may be some cohorts, however, that are small enough so that it may be desirable not to target those cohorts with invitations for submission of confidential data if it is not likely that the response rate will be high enough to receive enough confidential data submissions to provide meaningful statistical insights. Additionally, since the cohort is small, any error in the assumed response rate may have a profound effect on the performance in that cohort. For example, if the cohort is registered nurses in Fallon, Calif., a city with a population of only 8390, the number of eligible members may be, for example, 18. If the minimum number of data submissions to provide reasonable insights is four, an assumed response rate of 0.2 may be enough obtain the minimum number of insights, but if the margin of error in this assumed response rate is 0.1, the results may be as few as one response to as many as six, which is a pretty significant range with so few eligible members and where a variation of even a single submission can make the submitted confidential data worthless for statistical insights.

In an example embodiment, seeding across cohorts is performed such that invitations are only sent to members of a cohort where the assumed response rate is high enough, and the assumed response rate is calculating using data from other cohorts.

Specifically, in one example embodiment, one or more of the values of the attributes of the cohort is rolled up into a higher level of values of the attribute, for attributes that are hierarchical in nature. For example, both location and title may be considered to be hierarchical in nature, such that registered nurses can conceivably be rolled up into medical professionals (which may be a higher level title, also known as supertitle, or a function associated with multiple titles), while Fallon, Nev. may be rolled up into a higher region (e.g., Northern Nevada).

The rolling up may occur in an iterative nature, where each attribute is rolled up to see if the next level up in the hierarchy results in enough responses to make an accurate prediction of response rate and, if so, that higher level up in the hierarchy is used. If not, then the next higher level up is used.

In cases where there are multiple attributes that potentially can be rolled up, such as in the instant example where location and title can both be rolled up, each attribute may be rolled up independently and then the results compared to each other to see which rolling up produces the most responses, and thus the higher accuracy prediction of response rate. For example, if it is assumed that one needs at least 100 responses to make an accurate response rate for a given cohort, the cohort of registered nurses in Fallon, Nev. may be rolled up to both medical professionals in Fallon, Nev., which may have 7 responses, and registered nurses in Northern Nevada, which may have 68 responses. Since the latter cohort has more responses, it may be selected. However, since the number of responses in this latter cohort still is not greater than the minimum threshold of 100 responses, the algorithm may repeat, this time attempting to roll up the cohort of registered nurses in Northern Nevada to both medical professionals in Northern Nevada, which may have 212 responses, and registered nurses in all of Nevada, which may have 112 responses. Then, the number of invitations for the cohort of medical professionals in Northern Nevada may be examined to determine what the response rate was in this cohort. For example, in order to obtain the 212 responses, there may have been 1000 invitations sent, or a response rate of 0.212. Then, given the number of eligible members of the registered nurses in Fallon, Nev. cohort is 18, the estimated number of responses will be 4, which is enough to target this cohort by distributing the eligible members across a first and second wave. If, however, the number of responses in the medical professionals in Northern Nevada cohort was only 120, then the response rate is 120, which given the number of eligible members of the registered nurses in Fallon, Nev. cohort is 18, the estimated number of responses will be 2, which is not enough to target this cohort.

Because sending invitations promising that statistical insights will be provided, even if delayed, without actually being able to ensure that such insights will be made, can be detrimental from a customer service perspective, it may then be decided not to target the cohort of registered nurses in Fallon, Nev., or at least if invitations are sent out to submit confidential data, to make clear that no statistical insights may be possible for this limited cohort but that higher level insights (such as for medical professionals in Northern Nevada) may be possible.

In a variation of this example embodiment, the "rolling up" may not necessarily be up a hierarchy. Rather, a determination may be made that certain attribute values are similar even if they are on the same level, and the "rolling up" may involve simply including the responses for the cohort including those similar attribute values as opposed to necessarily one higher up the hierarchy. For example, San Francisco and New York are similar sized large metropolitan areas with similar costs of living but are both located at the city level of a location hierarchy. Due to their similarity, if there are not enough responses from San Francisco registered nurses to have an accurate response rate, it may be beneficial to attempt to "roll up" a cohort of registered nurses in San Francisco with a cohort of registered nurses in New York to see if enough responses are available from New York to have an accurate response rate, as opposed to, for example, rolling up to registered nurses in Northern California, which may include many cities having lower cost of living and smaller size and potentially having drastically different response rates from San Francisco than New York would have.

Similarity between attribute values may be deduced by, for example, looking at transitions between the attribute values. For example, if a large percentage of people moving from San Francisco move to New York, it may be assumed that San Francisco is similar to New York, likewise if a large percentage of people who change their title from registered nurse change it to nurse practitioner, it may be assumed that these titles are similar.

In another example embodiment, similarity may be deduced by looking at co-occurrences of the attribute values in member profiles. For example, the skill "Software programming" may co-occur with "software engineering" in a number of member profiles, making it more likely that these skills are similar to each other.

Figure 12:
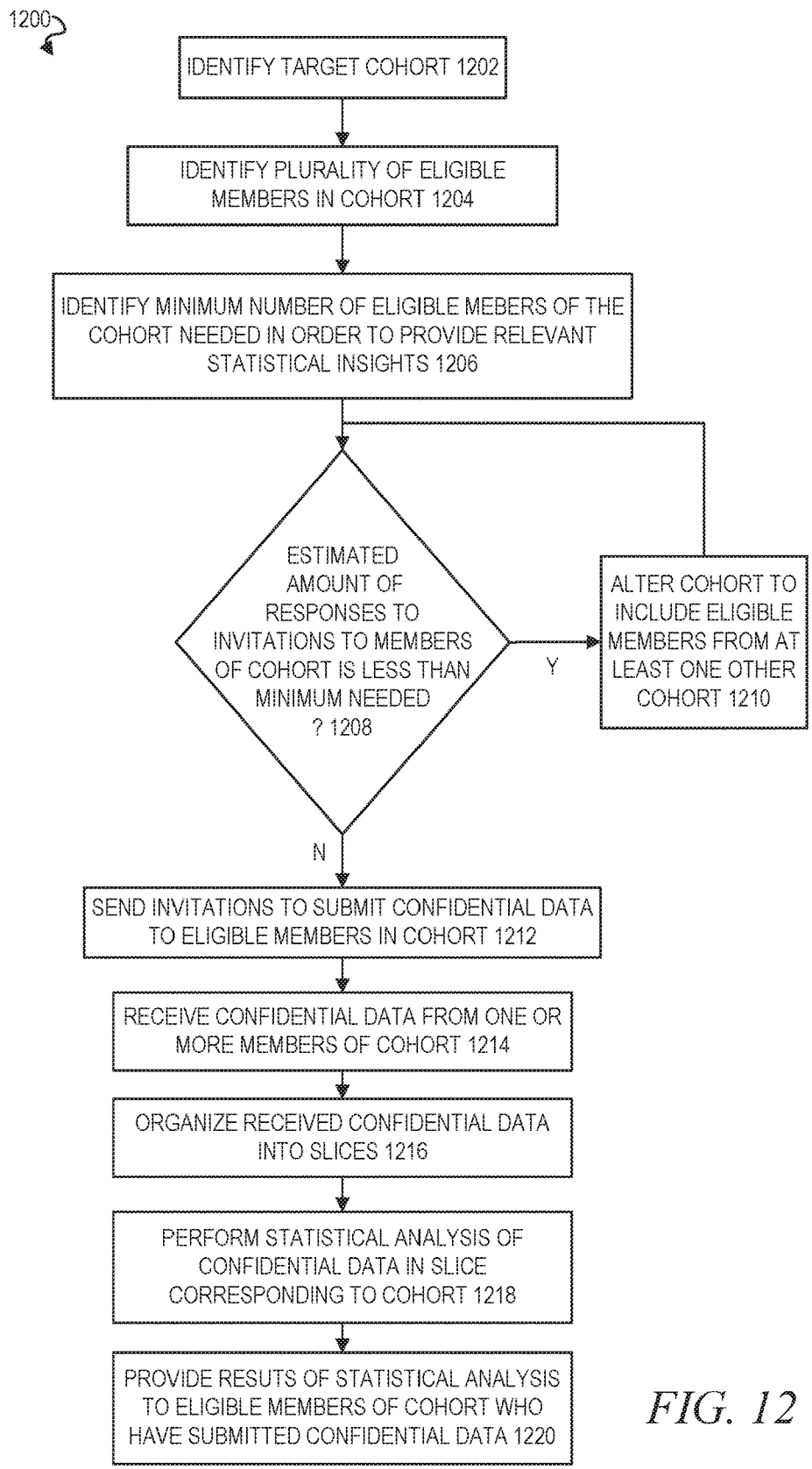
FIG. 12 is a flow diagram illustrating a method for obtaining confidential data from members of a social networking service in accordance with another example embodiment.

FIG. 12 is a flow diagram illustrating a method 1200 for obtaining confidential data from members of a social networking service in accordance with another example embodiment. At operation 1202, a cohort to target is identified. At operation 1204, a plurality of eligible members is identified from the plurality of members of the cohort. At operation 1206, a minimum number of eligible members needed to provide relevant statistical insights from confidential data submitted by eligible members of the cohort is determined. At operation 1208, based on an assumed response rate for eligible members of the cohort, a total number of eligible members in the cohort, and the minimum number of eligible members needed to provide relevant statistical insights, it is determined whether an estimated amount of responses to invitations to submit confidential data to eligible members of the cohort is less than the minimum number of eligible members needed to provide relevant statistical insights. If so, then at operation 1210, the cohort is altered to include eligible members from at least one other cohort. As described above, this alteration may include rolling up an attribute value of the cohort to a higher level attribute level for a hierarchical attribute, or adding to the cohort another attribute value that is similar to an attribute value of the cohort. In some example embodiments, as described above, a more detailed process where multiple roll-ups or additions are made and a comparison is made between the number of eligible members in the different potential new cohorts, with the cohort modified to the potential new cohort containing the most eligible members.

The method 1200 then returns to operation 1208 for this altered cohort. If it is determined at operation 1208 that the estimated amount of responses to invitations to submit confidential data to eligible members of the cohort is not less than the minimum number of eligible members needed to provide relevant statistical insights, then at operation 1212, invitations to submit confidential data are sent to eligible members in the cohort.

At operation 1214, confidential data from one or more of the eligible members in the cohort is received. At operation 1216, the received confidential data is organized into slices organized by cohort. At operation 1218, statistical analysis of confidential data in a slice corresponding to the altered cohort is performed. At operation 1220, results of the statistical analysis are provided to eligible members of the cohort who have submitted confidential data.

Figure 13A:
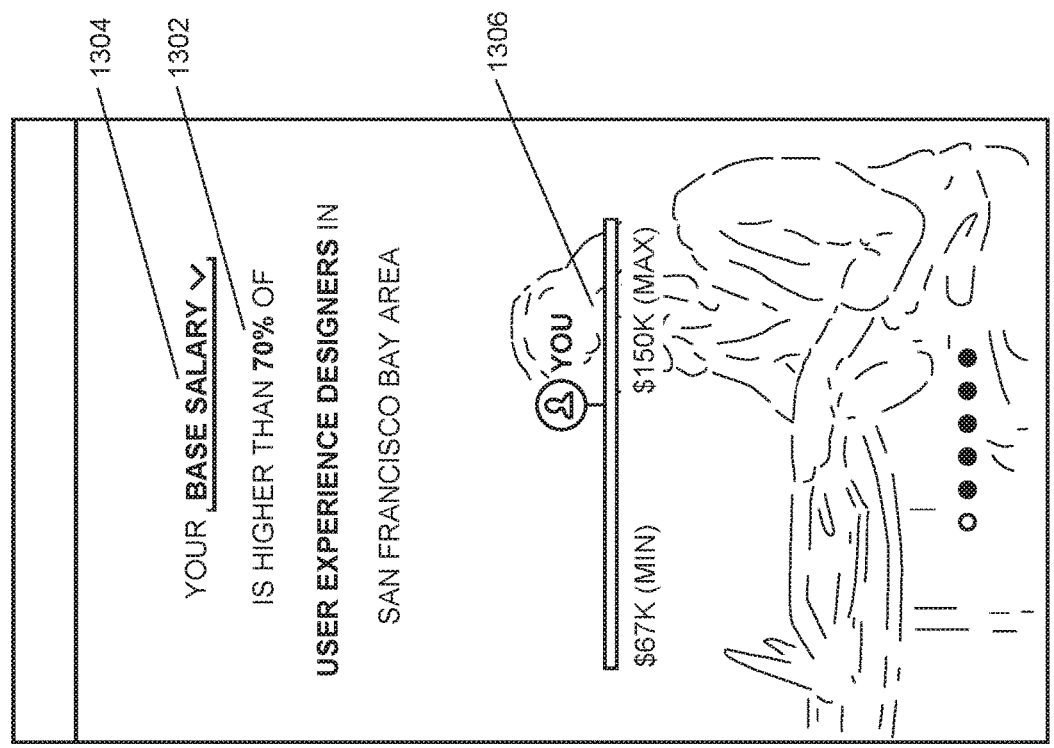
FIGS. 13A-13C are screen captures illustrating a user interface for displaying insights to a first user from confidential data submitted by other users, in accordance with an example embodiment.
Figure 13B:
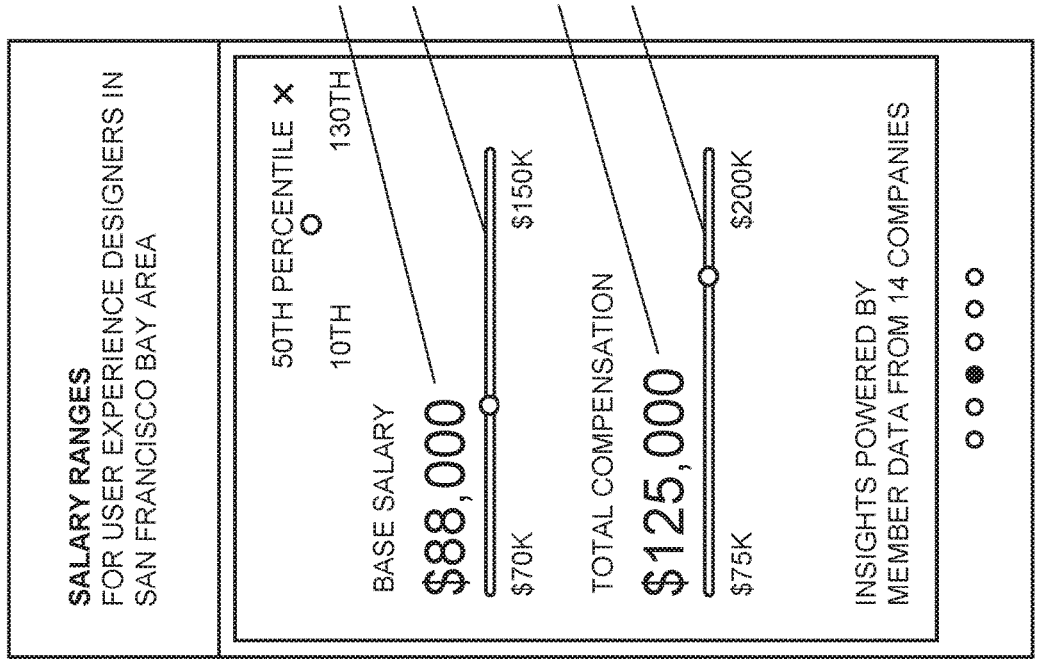
Figure 13C:
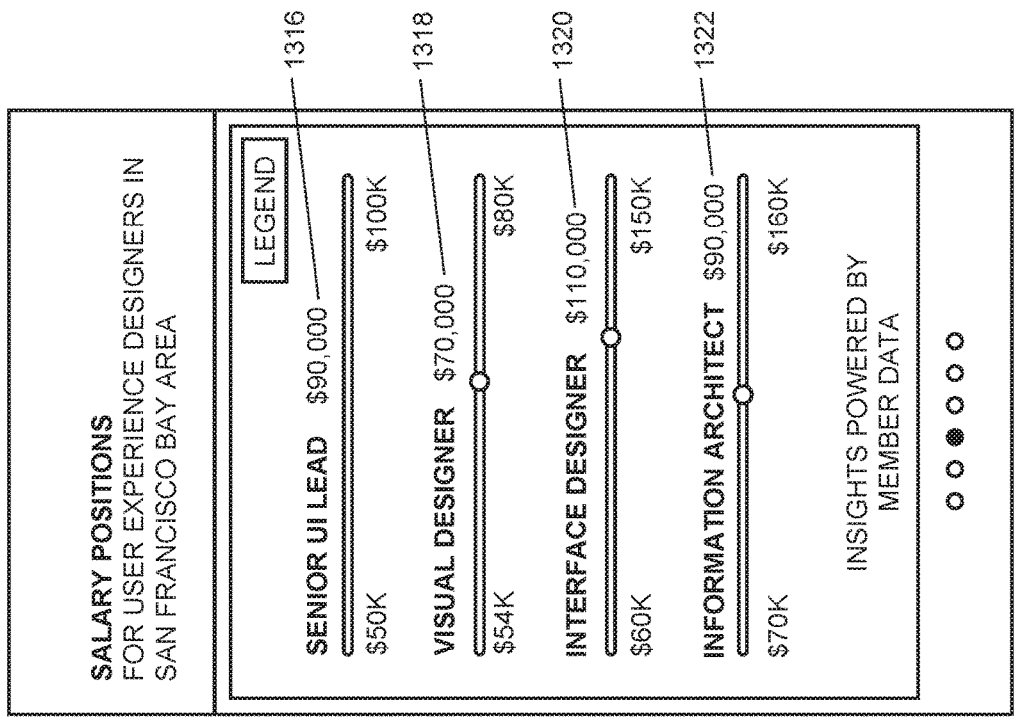

FIGS. 13A-13C are screen captures illustrating a user interface 1300 for displaying insights to a first user from confidential data submitted by other users, in accordance with an example embodiment. Referring first to FIG. 13A, the user interface 1300 displays a metric 1302 comparing confidential data of the first user to other users in a same slice as the first user. Here, for example, the first user is able to see that his base salary (as selectable via drop-down menu 1304) is higher than 70% of other users in the same slice (the slice being depicted as User Experience Designers in the San Francisco Bay Area). This metric is also displayed as a graphic 1306 for easy comparison.

Referring now to FIG. 13B, the user interface 1300 displays salary ranges for users in the same slice as the first user, including a median base salary 1308, a range of submitted base salaries 1310, median total compensation 1312, and a range of submitted total compensations 1314.

Referring now to FIG. 13C, the user interface 1300 displays insights 1316, 1318, 1320, and 1322 for related positions to the position of the first user. Notably, these insights 1316, 1318, 1320, and 1322 may require using information from slices other than the one the first user belongs to. In an example embodiment, there is no limitation on the confidential data frontend 104 retrieving insights from the confidential data insights data store 122 that come from slices different than ones to which the user being presented with the data insights belongs, although in some example embodiments, the confidential data front end 104 may itself wish to limit the first user's ability to ask for and/or view certain types of information (e.g., the confidential data front end 104 may permit the first user to view salary information for positions related to the first user's own position, but not unrelated positions).

As depicted above, all of the insights may be statistical information derived from confidential data submitted by users other than the user viewing the insights (as well as potentially including the user's own confidential data as well).

Modules, Components, and Logic

Certain embodiments are described herein as including logic or a number of components, modules, or mechanisms. Modules may constitute either software modules (e.g., code embodied on a machine-readable medium) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module may include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces ((e.g., an API).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

Machine and Software Architecture

The modules, methods, applications, and so forth described in conjunction with FIGS. 1-13C are implemented in some embodiments in the context of a machine and an associated software architecture. The sections below describe representative software architecture(s) and machine (e.g., hardware) architecture(s) that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, or so forth. A slightly different hardware and software architecture may yield a smart device for use in the "internee of things," while yet another combination produces a server computer for use within a cloud computing architecture. Not all combinations of such software and hardware architectures are presented here, as those of skill in the art can readily understand how to implement the inventive subject matter in different contexts from the disclosure contained herein.

Software Architecture

Figure 14:
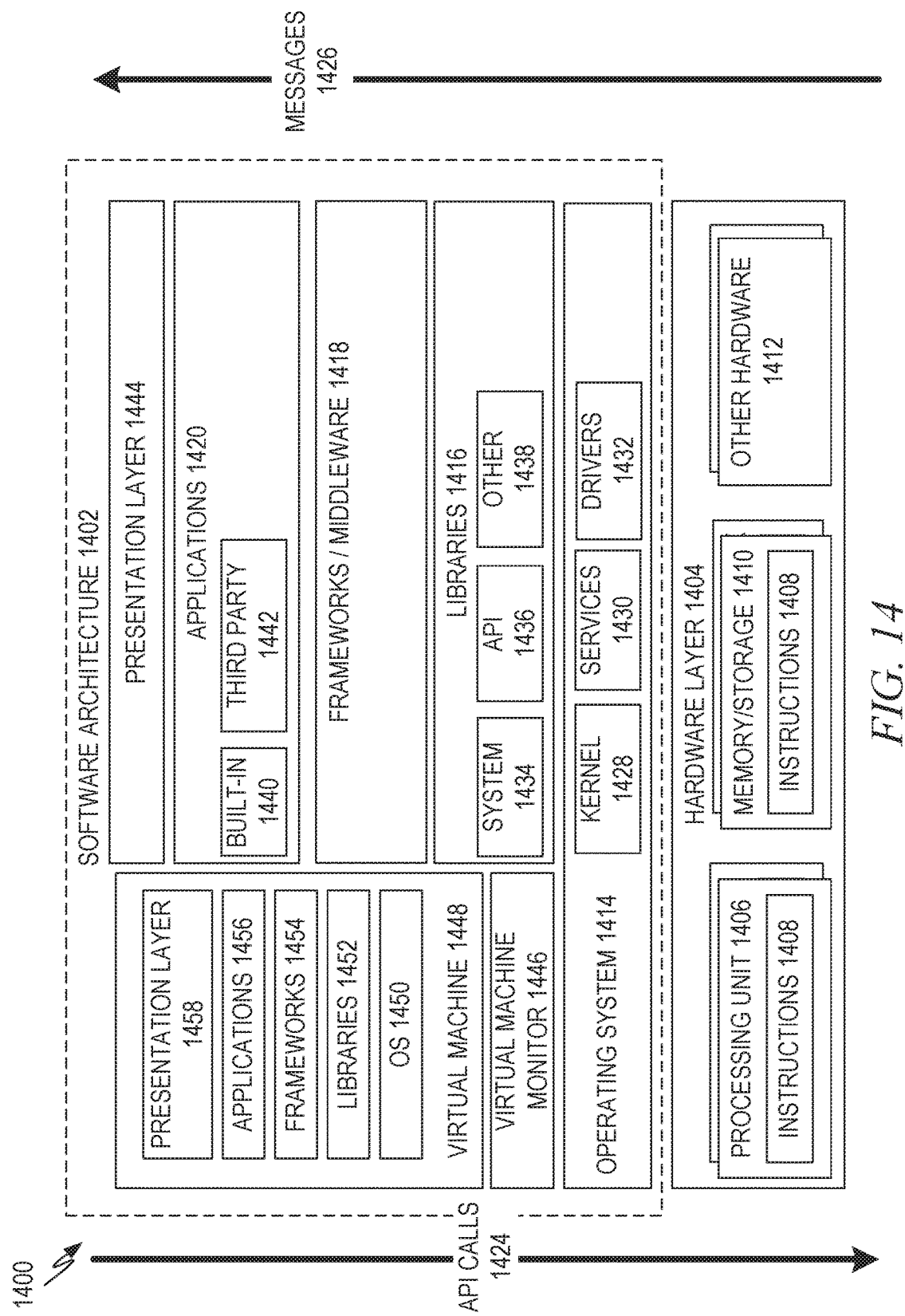
FIG. 14 is a block diagram illustrating a representative software architecture, which may be used in conjunction with various hardware architectures herein described.

FIG. 14 is a block diagram 1400 illustrating a representative software architecture 1402, which may be used in conjunction with various hardware architectures herein described. FIG. 14 is merely a non-limiting example of a software architecture, and it will be appreciated that many other architectures may be implemented to facilitate the functionality described herein. The software architecture 1402 may be executing on hardware such as a machine 1500 of FIG. 15 that includes, among other things, processors 1510, memory/storage 1530, and I/O components 1550. A representative hardware layer 1404 is illustrated and can represent, for example, the machine 1500 of FIG. 15. The representative hardware layer 1404 comprises one or more processing units 1406 having associated executable instructions 1408. The executable instructions 1408 represent the executable instructions of the software architecture 1402, including implementation of the methods, modules, and so forth of FIGS. 1-13C. The hardware layer 1404 also includes memory and/or storage modules 1410, which also have the executable instructions 1408. The hardware layer 1404 may also comprise other hardware 1412, which represents any other hardware of the hardware layer 1404, such as the other hardware illustrated as part of the machine 1500.

In the example architecture of FIG. 14, the software architecture 1402 may be conceptualized as a stack of layers where each layer provides particular functionality. For example, the software architecture 1402 may include layers such as an operating system 1414, libraries 1416, frameworks/middleware 1418, applications 1420, and a presentation layer 1444. Operationally, the applications 1420 and/or other components within the layers may invoke API calls 1424 through the software stack and receive responses, returned values, and so forth, illustrated as messages 1426, in response to the API calls 1424. The layers illustrated are representative in nature and not all software architectures have all layers. For example, some mobile or special purpose operating systems may not provide a layer of frameworks/middleware 1418, while others may provide such a layer. Other software architectures may include additional or different layers.

The operating system 1414 may manage hardware resources and provide common services. The operating system 1414 may include, for example, a kernel 1428, services 1430, and drivers 1432. The kernel 1428 may act as an abstraction layer between the hardware and the other software layers. For example, the kernel 1428 may be responsible for memory management, processor management (e.g., scheduling), component management, networking, security settings, and so on. The services 1430 may provide other common services for the other software layers. The drivers 1432 may be responsible for controlling or interfacing with the underlying hardware. For instance, the drivers 1432 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1416 may provide a common infrastructure that may be utilized by the applications 1420 and/or other components and/or layers. The libraries 1416 typically provide functionality that allows other software modules to perform tasks in an easier fashion than by interfacing directly with the underlying operating system 1414 functionality (e.g., kernel 1428, services 1430, and/or drivers 1432). The libraries 1416 may include system libraries 1434 (e.g., C standard library) that may provide functions such as memory allocation functions, string manipulation functions, mathematical functions, and the like. In addition, the libraries 1416 may include API libraries 1436 such as media libraries (e.g., libraries to support presentation and manipulation of various media formats such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1416 may also include a wide variety of other libraries 1438 to provide many other APIs to the applications 1420 and other software components/modules.

The frameworks 1418 (also sometimes referred to as middleware) may provide a higher-level common infrastructure that may be utilized by the applications 1420 and/or other software components/modules. For example, the frameworks 1418 may provide various graphic user interface (GUI) functions, high-level resource management, high-level location services, and so forth. The frameworks 1418 may provide a broad spectrum of other APIs that may be utilized by the applications 1420 and/or other software components/modules, some of which may be specific to a particular operating system or platform.

The applications 1420 include built-in applications 1440 and/or third party applications 1442. Examples of representative built-in applications 1440 may include, but are not limited to, a contacts application, a browser application, a book reader application, a location application, a media application, a messaging application, and/or a game application. The third party applications 1442 may include any of the built-in applications 1440 as well as a broad assortment of other applications. In a specific example, the third party application 1442 (e.g., an application developed using the Android™ or iOS® software development kit (SDK) by an entity other than the vendor of the particular platform) may be mobile software running on a mobile operating system such as iOS™, Android™, Windows® Phone, or other mobile operating systems. In this example, the third party application 1442 may invoke the API calls 1424 provided by the mobile operating system such as the operating system 1414 to facilitate functionality described herein.

The applications 1420 may utilize built-in operating system 1414 functions (e.g., kernel 1428, services 1430, and/or drivers 1432), libraries 1416 (e.g., system libraries 1434, API libraries 1436, and other libraries 1438), and frameworks/middleware 1418 to create user interfaces to interact with users of the system. Alternatively, or additionally, in some systems, interactions with a user may occur through a presentation layer, such as the presentation layer 1444. In these systems, the application/module "logic" can be separated from the aspects of the application/module that interact with a user.

Some software architectures utilize virtual machines. In the example of FIG. 14, this is illustrated by a virtual machine 1448. A virtual machine creates a software environment where applications/modules can execute as if they were executing on a hardware machine (such as the machine 1500 of FIG. 15, for example). A virtual machine is hosted by a host operating system (e.g., operating system 1414 in FIG. 14) and typically, although not always, has a virtual machine monitor 1446, which manages the operation of the virtual machine 1448 as well as the interface with the host operating system (e.g., operating system 1414). A software architecture executes within the virtual machine 1448, such as an operating system 1450, libraries 1452, frameworks/middleware 1454, applications 1456, and/or a presentation layer 1458. These layers of software architecture executing within the virtual machine 1448 can be the same as corresponding layers previously described or may be different.

Example Machine Architecture and Machine-Readable Medium

Figure 15:
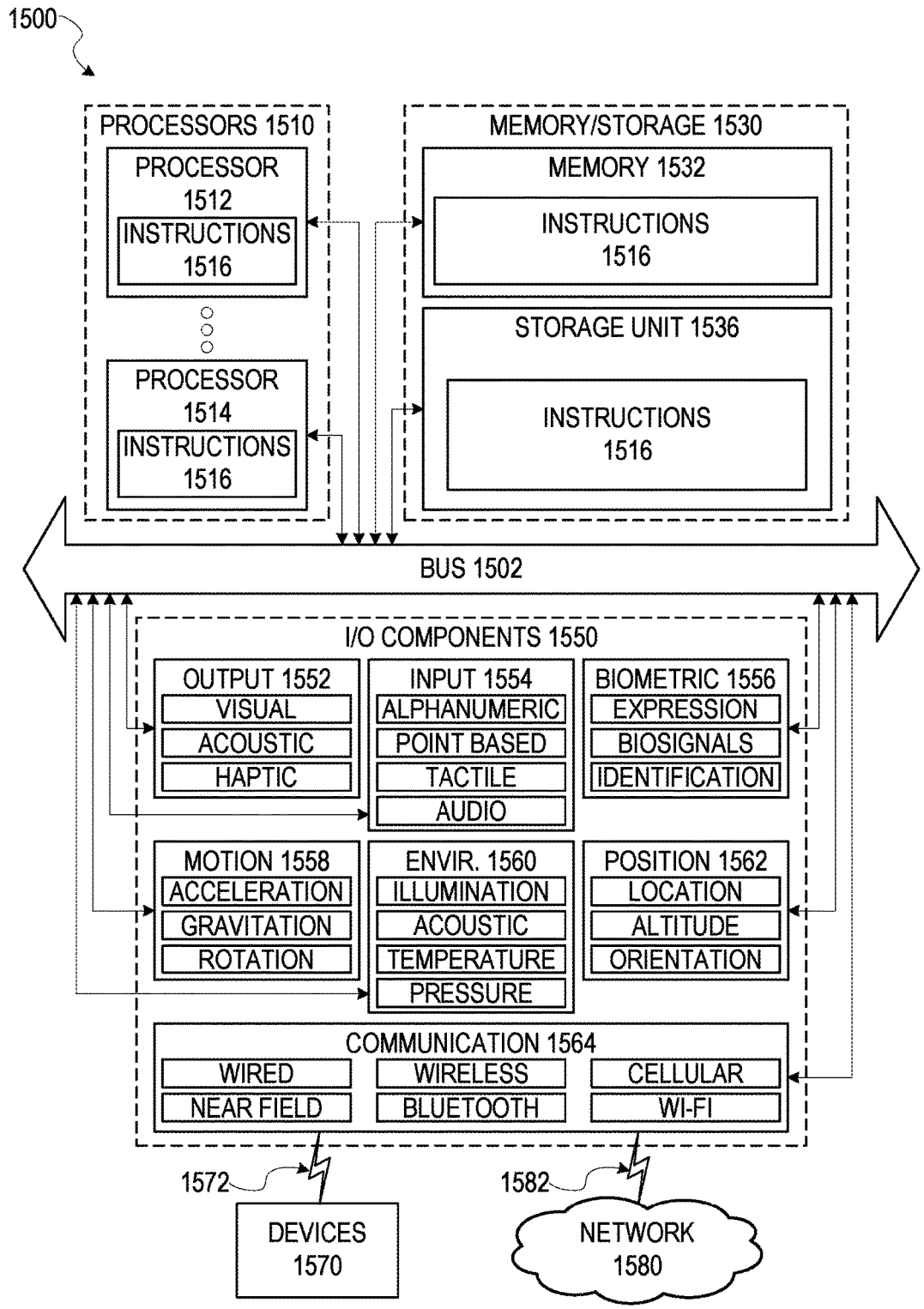
FIG. 15 is a block diagram illustrating components of a machine, according to some example embodiments, able to read instructions from a machine-readable medium (e.g., a machine-readable storage medium) and perform any one or more of the methodologies discussed herein.

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1516 software, a program, an application, an applet, an app, or other executable code) for causing the machine 1500 to perform any one or more of the methodologies discussed herein may be executed. The instructions transform the general, non-programmed machine into a particular machine programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify, actions to be taken by the machine 1500. Further, while only a single machine 1500 is illustrated, the term "machine" shall also be taken to include a collection of machines 1500 that individually or jointly execute the instructions 1516 to perform any one or more of the methodologies discussed herein.

The machine 1500 may include processors 1510, memory/storage 1530, and I/O components 1550, which may be configured to communicate with each other such as via a bus 1502. In an example embodiment, the processors 1510 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an ASIC, a Radio-Frequency Integrated Circuit (RFIC), another processor, or any suitable combination thereof) may include, for example, a processor 1512 and a processor 1514 that may execute the instructions 1516. The term "processor" is intended to include multi-core processors that may comprise two or more independent processors (sometimes referred to as "cores") that may execute instructions 1516 contemporaneously. Although FIG. 15 shows multiple processors 1510, the machine 1500 may include a single processor with a single core, a single processor with multiple cores (e.g., a multi-core processor), multiple processors with a single core, multiple processors with multiples cores, or any combination thereof.

The memory/storage 1530 may include a memory 1532, such as a main memory, or other memory storage, and a storage unit 1536, both accessible to the processors 1510 such as via the bus 1502. The storage unit 1536 and memory 1532 store the instructions 1516 embodying any one or more of the methodologies or functions described herein. The instructions 1516 may also reside, completely or partially, within the memory 1532, within the storage unit 1536, within at least one of the processors 1510 (e.g., within the processor's cache memory), or any suitable combination thereof, during execution thereof by the machine 1500. Accordingly, the memory 1532, the storage unit 1536, and the memory of the processors 1510 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 1516. The term "machine-readable medium" shall also be taken to include any medium, or combination of multiple media, that is capable of storing instructions (e.g., instructions 1516) for execution by a machine (e.g., machine 1500), such that the instructions, when executed by one or more processors of the machine (e.g., processors 1510), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 1550 may include a wide variety of components to receive input, provide output, produce output, transmit information, exchange information, capture measurements, and so on. The specific I/O components 1550 that are included in a particular machine will depend on the type of machine. For example, portable machines such as mobile phones will likely include a touch input device or other such input mechanisms, while a headless server machine will likely not include such a touch input device. It will be appreciated that the I/O components 1550 may include many other components that are not shown in FIG. 15. The I/O components 1550 are grouped according to functionality merely for simplifying the following discussion and the grouping is in no way limiting. In various example embodiments, the I/O components 1550 may include output components 1552 and input components 1554. The output components 1552 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1554 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1550 may include biometric components 1556, motion components 1558, environmental components 1560, or position components 1562, among a wide array of other components. For example, the biometric components 1556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1558 may include acceleration sensor components (e.g., accelerometer), gravitation sensor components, rotation sensor components (e.g., gyroscope), and so forth. The environmental components 1560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1562 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 may include a network interface component or other suitable device to interface with the network 1580. In further examples, the communication components 1564 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1570 may be another machine or any of a wide variety of peripheral devices (e.g., a peripheral device coupled via a USB).

Moreover, the communication components 1564 may detect identifiers or include components operable to detect identifiers. For example, the communication components 1564 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1564, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 1580 may be an ad hoc network, an intranet, an extranet, a virtual private network (VPN), a local area network (LAN), a wireless LAN (WLAN), a WAN, a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 1580 or a portion of the network 1580 may include a wireless or cellular network and the coupling 1582 may be a Code Division Multiple Access (CDMA) connection, a Global System for Mobile communications (GSM) connection, or another type of cellular or wireless coupling. In this example, the coupling 1582 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

The instructions 1516 may be transmitted or received over the network 1580 using a transmission medium via a network interface device (e.g., a network interface component included in the communication components 1564) and utilizing any one of a number of well-known transfer protocols (e.g., HTTP). Similarly, the instructions 1516 may be transmitted or received using a transmission medium via the coupling 1572 (e.g., a peer-to-peer coupling) to the devices 1570. The term "transmission medium" shall be taken to include any intangible medium that is capable of storing, encoding, or carrying the instructions 1516 for execution by the machine 1500, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A computerized method comprising:
   in a training phase:
   obtaining a plurality of pieces of sample labeled information with sample missing attribute values identifying attribute values missing from the sample labeled information;
   for each of the plurality of pieces of sample labeled information:
   extracting one or more features from the piece of sample labeled information;
   feeding the extracted one or more features and the sample missing attribute values into a machine learning algorithm to train an attribute inference model to output missing attribute values for the sample missing attribute values based on the extracted one or more features;
   in an attribute inference phase:
   obtaining information about a user;
   passing the information to the attribute inference model to generate one or more attribute values for attribute values missing in the information;
   modifying a collection flow, defined in a user interface of a computing device, based on the generated one or more missing attribute values, the collection flow defining a sequence of screens; and
   presenting the modified collection flow to the user in the user interface.

2. The method of claim 1, wherein the attribute inference model is further trained to output a confidence score for each of the one or more missing attribute values and the modifying includes comparing, for each of the one or more missing attribute values, the confidence score to at least one threshold and modifying the collection flow for missing attribute values having confidence scores transgressing the at least one threshold.

3. The method of claim 1, wherein the modifying includes prepopulating the generated one or more missing attribute values in one or more screens of the user interface.

4. The method of claim 1, wherein the one or more features includes co-occurrence of the missing one or more attribute values with attribute values contained in the pieces of sample information.

5. The method of claim 1, wherein the one or more attribute values include one or more skills.

6. The method of claim 1, further comprising:
   adding confidential data collected via the modified collection flow to a first submission table;
   adding at least one of the generated one or more missing attribute values to a second submission table along with one or more attribute values in a data structure; and
   assigning the confidential data from the first submission table to a slice table corresponding to a slice including, from the second submission table, the one or more missing attribute values and the one or more attribute values in the data structure.

7. The method of claim 6, wherein the first submission table is the same as the second submission table.

8. A system comprising:
a computer-readable medium having instructions stored there on, which, when executed by a processor, cause the system to perform operations comprising:
in a training phase:
obtaining a plurality of pieces of sample labeled information with sample missing attribute values identifying attribute values missing from the sample labeled information;
for each of the plurality of pieces of sample labeled information:
extracting one or more features from the piece of sample labeled information;
feeding the extracted one or more features and the sample missing attribute values into a machine learning algorithm to train an attribute inference model to output missing attribute values for the sample missing attribute values based on the extracted one or more features;
in an attribute inference phase:
obtaining information about a user;
passing the information to the attribute inference model to generate one or more attribute values for attribute values missing in the information;
modifying a collection flow, defined in a user interface of a computing device, based on the generated one or more missing attribute values, the collection flow defining a sequence of screens; and
presenting the modified collection flow to the user in the user interface.

9. The system of claim 8, wherein the attribute inference model is further trained to output a confidence score for each of the one or more missing attribute values and the modifying includes comparing, for each of the one or more missing attribute values, the confidence score to at least one threshold and modifying the collection flow for missing attribute values having confidence scores transgressing the at least one threshold.

10. The system of claim 8, wherein the modifying includes prepopulating the generated one or more missing attribute values in one or more screens of the user interface.

11. The system of claim 8, wherein the one or more features includes co-occurrence of the missing one or more attribute values with attribute values contained in the pieces of sample information.

12. The system of claim 8, wherein the one or more attribute values include one or more skills.

13. The system of claim 8, wherein the operations further comprise:
adding confidential data collected via the modified collection flow to a first submission table;
adding at least one of the generated one or more missing attribute values to a second submission table along with one or more attribute values in a data structure; and
assigning the confidential data from the first submission table to a slice table corresponding to a slice including, from the second submission table, the one or more missing attribute values and the one or more attribute values in the data structure.

14. The system of claim 13, wherein the first submission table is the same as the second submission table.

15. A non-transitory machine-readable storage medium comprising instructions, which when implemented by one or more machines, cause the one or more machines to perform operations comprising:
in a training phase:
obtaining a plurality of pieces of sample labeled information with sample missing attribute values identifying attribute values missing from the sample labeled information;
for each of the plurality of pieces of sample labeled information:
extracting one or more features from the piece of sample labeled information;
feeding the extracted one or more features and the sample missing attribute values into a machine learning algorithm to train an attribute inference model to output missing attribute values for the sample missing attribute values based on the extracted one or more features;
in an attribute inference phase:
obtaining information about a user;
passing the information to the attribute inference model to generate one or more attribute values for attribute values missing in the information;
modifying a collection flow, defined in a user interface of a computing device, based on the generated one or more missing attribute values, the collection flow defining a sequence of screens; and
presenting the modified collection flow to the user in the user interface.

16. The non-transitory machine-readable storage medium of claim 15, wherein the attribute inference model is further trained to output a confidence score for each of the one or more missing attribute values and the modifying includes comparing, for each of the one or more missing attribute values, the confidence score to at least one threshold and modifying the collection flow for missing attribute values having confidence scores transgressing the at least one threshold.

17. The non-transitory machine-readable storage medium of claim 15, wherein the modifying includes prepopulating the generated one or more missing attribute values in one or more screens of the user interface.

18. The non-transitory machine-readable storage medium of claim 15, wherein the one or more features includes co-occurrence of the missing one or more attribute values with attribute values contained in the pieces of sample information.

19. The non-transitory machine-readable storage medium of claim 15, wherein the operations further comprise:
adding confidential data collected via the modified collection flow to a first submission table;
adding at least one of the generated one or more missing attribute values to a second submission table along with one or more attribute values in a data structure; and
assigning the confidential data from the first submission table to a slice table corresponding to a slice including, from the second submission table, the one or more missing attribute values and the one or more attribute values in the data structure.

20. The non-transitory machine-readable storage medium of claim 19, wherein the first submission table is the same as the second submission table.

* * * * *